US011822224B2

(12) United States Patent
Yanagisawa

(10) Patent No.: US 11,822,224 B2
(45) Date of Patent: Nov. 21, 2023

(54) PROJECTION SYSTEM AND PROJECTOR HAVING DEFLECTOR AND OPTICAL ELEMENT

(71) Applicant: SEIKO EPSON CORPORATION, Tokyo (JP)

(72) Inventor: Hirotaka Yanagisawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/155,337

(22) Filed: Jan. 22, 2021

(65) Prior Publication Data

US 2021/0232033 A1 Jul. 29, 2021

(30) Foreign Application Priority Data

Jan. 24, 2020 (JP) .................................. 2020-009801

(51) Int. Cl.
*G03B 21/28* (2006.01)
*G02B 13/16* (2006.01)
*G03B 21/20* (2006.01)

(52) U.S. Cl.
CPC ............. *G03B 21/28* (2013.01); *G02B 13/16* (2013.01); *G03B 21/2066* (2013.01)

(58) Field of Classification Search
CPC ..................... G03B 21/28; G02B 21/2066
See application file for complete search history.

(56) References Cited

U.S. PATENT DOCUMENTS

| 7,048,388 | B2 | 5/2006 | Takaura et al. |
| 7,549,755 | B2 | 6/2009 | Suzuki |
| 8,950,874 | B2 | 2/2015 | Tatsuno |
| 9,052,580 | B2 * | 6/2015 | Fujioka ................ H04N 9/3141 |
| 10,025,092 | B1 * | 7/2018 | Lin ......................... G03B 21/28 |
| 11,042,083 | B2 * | 6/2021 | Morikuni ............... G02B 13/16 |
| 11,086,112 | B2 * | 8/2021 | Morikuni ............... G02B 13/16 |
| 11,106,122 | B2 * | 8/2021 | Wang ..................... G02B 13/18 |
| 2004/0156117 | A1 | 8/2004 | Takaura et al. |
| 2006/0067662 | A1 | 3/2006 | Satori |
| 2006/0193036 | A1 | 8/2006 | Suzuki |
| 2013/0070217 | A1 | 3/2013 | Tatsuno |
| 2013/0114052 | A1 * | 5/2013 | Fujioka ................ H04N 9/3114 |
| | | | 353/98 |
| 2015/0346469 | A1 * | 12/2015 | Lin ......................... G02B 13/16 |
| | | | 353/98 |

(Continued)

FOREIGN PATENT DOCUMENTS

| JP | 2004-246042 A | 9/2004 |
| JP | 2006-098685 A | 4/2006 |

(Continued)

*Primary Examiner* — Bao-Luan Q Le
(74) *Attorney, Agent, or Firm* — Oliff PLC

(57) ABSTRACT

A projection system includes a first optical system, a second optical system including an optical element and disposed on the enlargement side of the first optical system, and a deflector disposed between the first optical system and the second optical system and deflecting the optical path. The optical element has a first transmissive surface, a reflection surface disposed on the enlargement side of the first transmissive surface, and a second transmissive surface disposed on the enlargement side of the reflection surface.

17 Claims, 13 Drawing Sheets

(56) References Cited

U.S. PATENT DOCUMENTS

| | | | |
|---|---|---|---|
| 2016/0116830 A1* | 4/2016 | Lin | G02B 17/08 |
| | | | 353/97 |
| 2018/0059380 A1 | 3/2018 | Nagatoshi | |
| 2018/0299670 A1 | 10/2018 | Takahashi | |
| 2019/0011684 A1 | 1/2019 | Ishihara et al. | |
| 2019/0056648 A1* | 2/2019 | Amano | G02B 13/16 |
| 2019/0285979 A1* | 9/2019 | Takano | G03B 21/008 |
| 2019/0331999 A1* | 10/2019 | Lee | G03B 21/008 |
| 2021/0033829 A1* | 2/2021 | Ishigame | G02B 13/18 |

FOREIGN PATENT DOCUMENTS

| | | |
|---|---|---|
| JP | 2006-235516 A | 9/2006 |
| JP | 2007-316674 A | 12/2007 |
| JP | 2010-020344 A | 1/2010 |
| JP | 5691962 B2 | 4/2015 |
| JP | 2017-156712 A | 9/2017 |
| JP | 2017-156713 A | 9/2017 |
| JP | 2017-156714 A | 9/2017 |
| JP | 2018-036390 A | 3/2018 |
| JP | 2019-133061 A | 8/2019 |
| JP | 2020-42103 A | 3/2020 |
| JP | 2020-194115 A | 12/2020 |
| WO | 2017/109856 A1 | 6/2017 |

* cited by examiner

PROJECTION SYSTEM AND PROJECTOR HAVING DEFLECTOR AND OPTICAL ELEMENT

The present application is based on, and claims priority from JP Application Serial Number 2020-009801, filed Jan. 24, 2020, the disclosure of which is hereby incorporated by reference herein in its entirety.

BACKGROUND

1. Technical Field

The present disclosure relates to a projection system and a projector.

2. Related Art

JP-A-2010-20344 describes a projector that enlarges and projects a projection image formed by an image formation section via a projection system. The projection system described in JP-A-2010-20344 is formed of a first optical system and a second optical system sequentially arranged from the reduction side toward the enlargement side. The first optical system includes a refractive optical system. The second optical system is formed of a reflection mirror having a concave reflection surface. The image formation section includes a light source and a light valve. The image formation section forms a projection image in the reduction-side image formation plane of the projection system. The projection system forms an intermediate image in a position between the first optical system and the reflection surface and projects a final image on a screen disposed in the enlargement-side image formation plane of the projection system.

The projection system and the projector are required to have a shorter projection distance. An attempt to further shorten the projection distance in the configuration using the projection system described in JP-A-2010-20344, however, causes a problem of a difficulty in designing the projection system.

SUMMARY

To solve the problem described above, a projection system according to an aspect of the present disclosure includes a first optical system, a second optical system including an optical element and disposed on an enlargement side of the first optical system, and a deflector disposed between the first optical system and the second optical system and deflecting an optical path of the projection system. The optical element has a first transmissive surface, a reflection surface disposed on the enlargement side of the first transmissive surface, and a second transmissive surface disposed on the enlargement side of the reflection surface.

A projector according to another aspect of the present disclosure includes the projection system described above and an image formation section that forms a projection image in a reduction-side image formation plane of the projection system.

DESCRIPTION OF EXEMPLARY EMBODIMENTS

A projection system according to an embodiment of the present disclosure and a projector including the projection system will be described below in detail with reference to the drawings.

Projector

Figure 1:
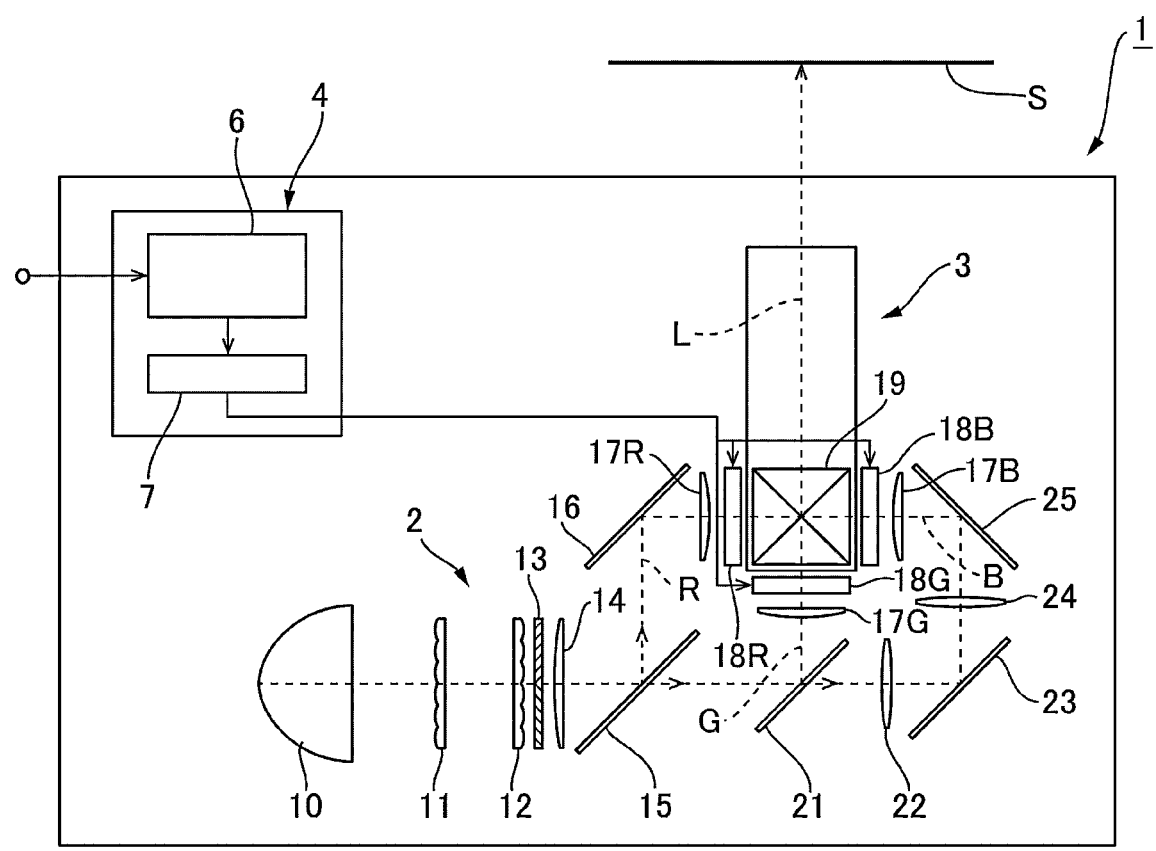
FIG. 1 is a schematic configuration diagram of a projector including a projection system.

FIG. 1 is a schematic configuration diagram of a projector including a projection system 3 according to the present disclosure. A projector 1 includes an image formation section 2, which generates a projection image to be projected on a screen S, the projection system 3, which enlarges the projection image and projects the enlarged image on the screen S, and a controller 4, which controls the action of the image formation section 2, as shown in FIG. 1.

Image Generation Optical System and Controller

The image formation section 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides the light flux from the light source 10 into a plurality of light fluxes. The lens elements of the first optical integration lens 11 focus the light flux from the light source 10 in the vicinity of the lens elements of the second optical integration lens 12.

The polarization converter 13 converts the light via the second optical integration lens 12 into predetermined linearly polarized light. The superimposing lens 14 superimposes images of the lens elements of the first optical integration lens 11 on one another in a display region of each of liquid crystal panels 18R, 18G, and 18B, which will be described later, via the second optical integration lens 12.

The image formation section 2 further includes a first dichroic mirror 15, a reflection mirror 16, a field lens 17R, and the liquid crystal panel 18R. The first dichroic mirror 15 reflects R light, which is part of the light rays incident via the superimposing lens 14, and transmits G light and B light, which are part of the light rays incident via the superimposing lens 14. The R light reflected off the first dichroic mirror 15 travels via the reflection mirror 16 and the field lens 17R and is incident on the liquid crystal panel 18R. The liquid crystal panel 18R is a light modulator. The liquid crystal panel 18R modulates the R light in accordance with an image signal to form a red projection image.

The image formation section 2 further includes a second dichroic mirror 21, a field lens 17G, and the liquid crystal panel 18G. The second dichroic mirror 21 reflects the G light, which is part of the light rays via the first dichroic mirror 15, and transmits the B light, which is part of the light rays via the first dichroic mirror 15. The G light reflected off the second dichroic mirror 21 passes through the field lens 17G and is incident on the liquid crystal panel 18G. The liquid crystal panel 18G is a light modulator. The liquid crystal panel 18G modulates the G light in accordance with an image signal to form a green projection image.

The image formation section 2 further includes a relay lens 22, a reflection mirror 23, a relay lens 24, a reflection mirror 25, a field lens 17B, and the liquid crystal panel 18B. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is a light modulator. The liquid crystal panel 18B modulates the B light in accordance with an image signal to form a blue projection image.

The liquid crystal panels 18R, 18G, and 18B surround a cross dichroic prism 19 in such a way that the liquid crystal panels 18R, 18G, and 18B face three sides of the cross dichroic prism 19. The cross dichroic prism 19, which is a prism for light combination, produces a projection image that is the combination of the light modulated by the liquid crystal panel 18R, the light modulated by the liquid crystal panel 18G, and the light modulated by the liquid crystal panel 18B.

The cross dichroic prism 19 forms part of the projection system 3. The projection system 3 enlarges and projects the projection images (images formed by liquid crystal panels 18R, 18G, and 18B) combined by the cross dichroic prism 19 on the screen S. The screen S is the enlargement-side image formation plane of the projection system 3.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors of the corresponding color. The display driver 7 operates the liquid crystal panels 18R, 18G, and 18B based on the color projection image signals outputted from the image processor 6. The image processor 6 thus causes the liquid crystal panels 18R, 18G, and 18B to display projection images corresponding to the image signals.

Projection System

The projection system 3 will next be described. Examples 1 to 3 will be described below as examples of the configuration of the projection system 3 incorporated in the projector 1. In the light ray diagrams of the projection systems according to Examples 1 to 3, the liquid crystal panels 18R, 18G, and 18B are referred to as liquid crystal panels 18.

Example 1

Figure 2:
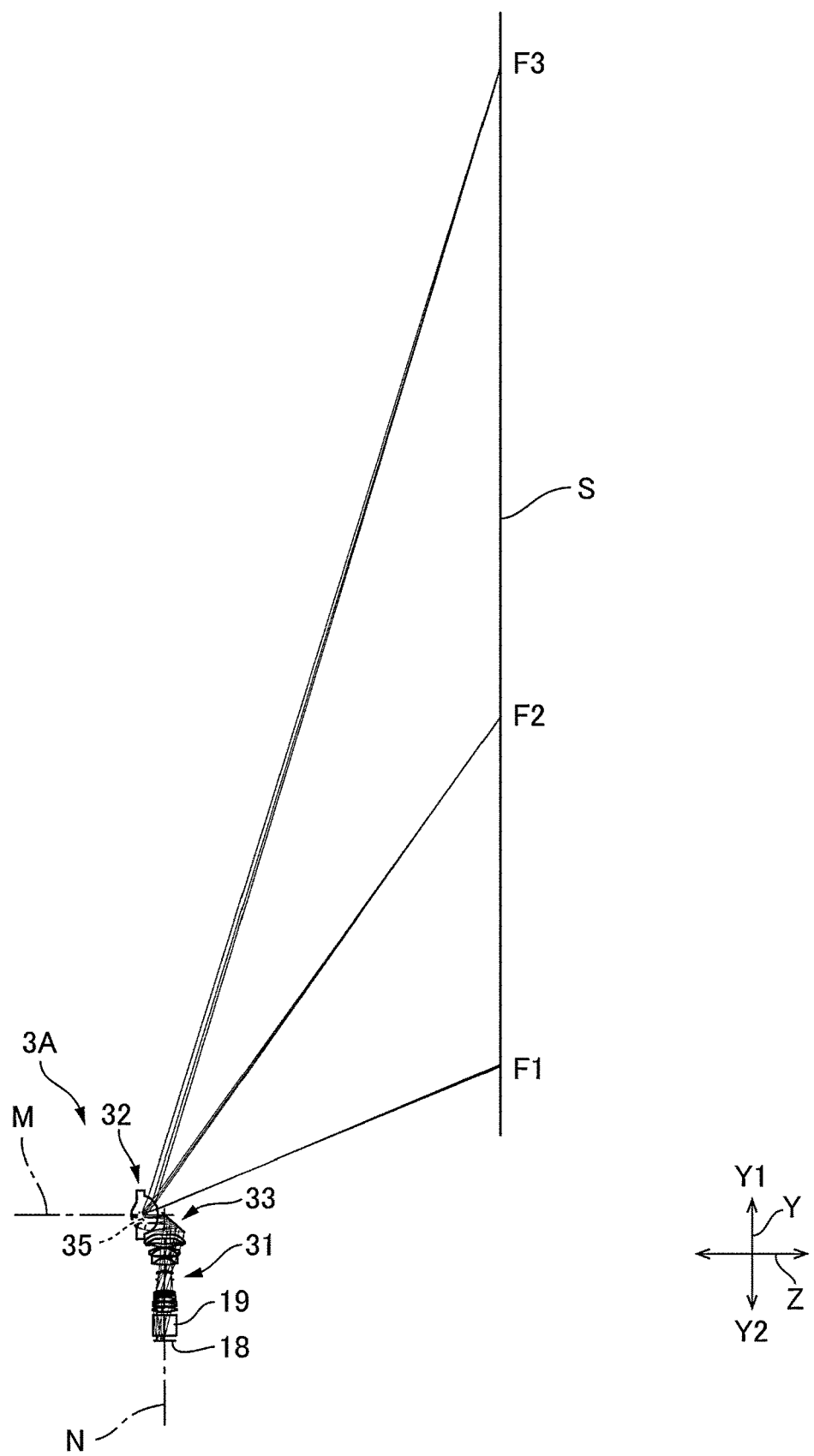
FIG. 2 is a light ray diagram diagrammatically showing the entire projection system according to Example 1.
Figure 3:
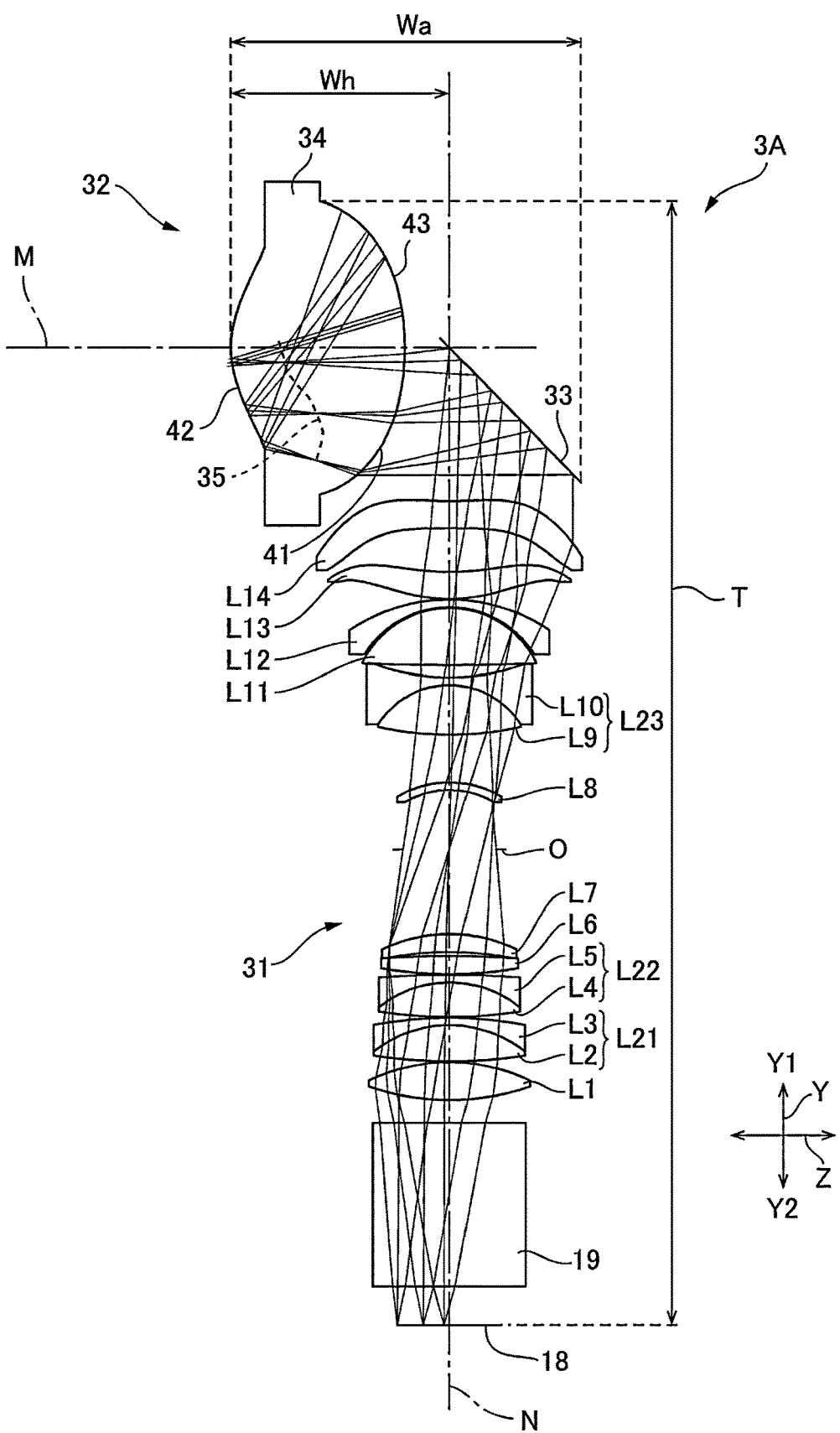
FIG. 3 is a light ray diagram of the projection system according to Example 1.
Figure 4:
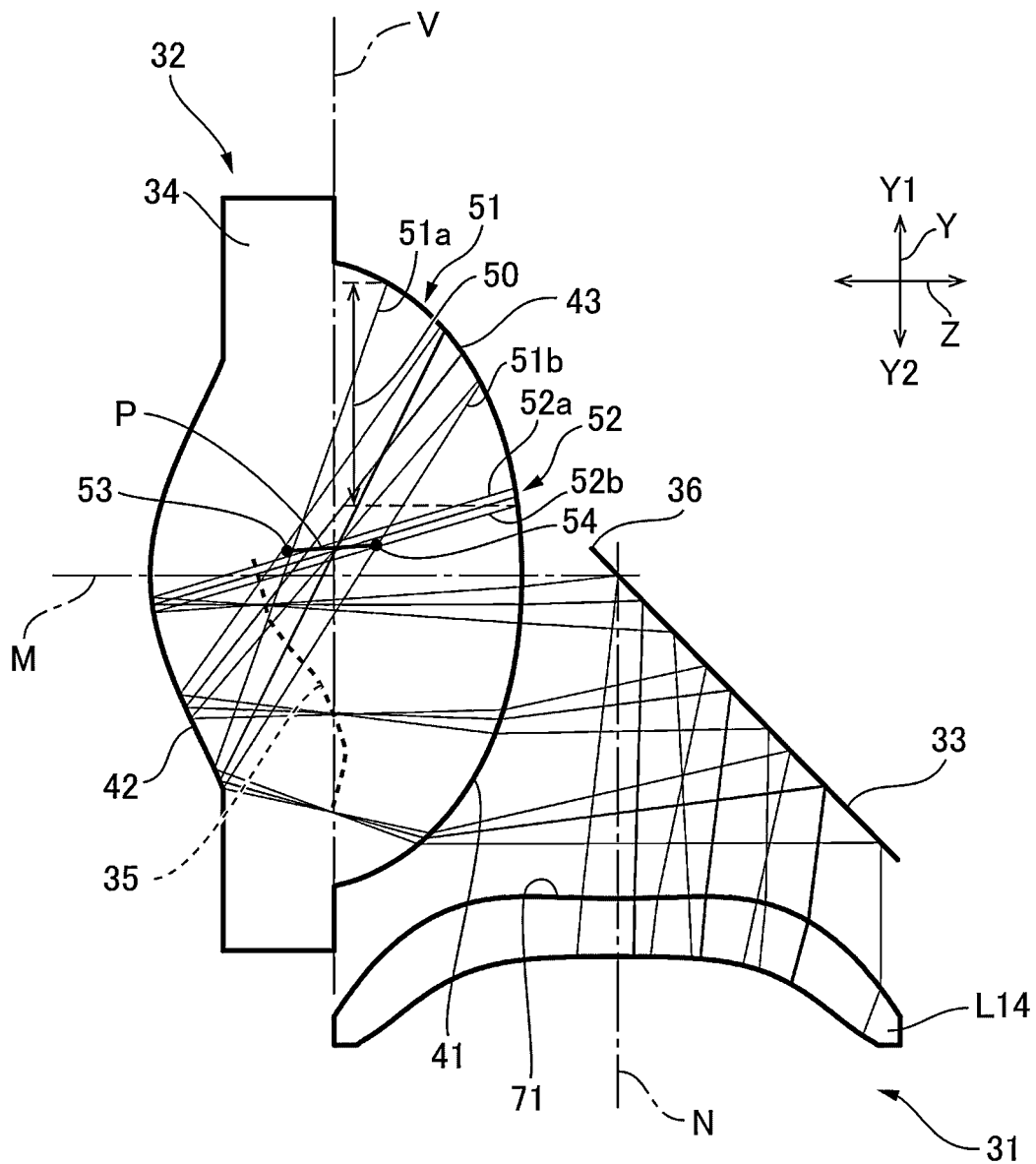
FIG. 4 is a light ray diagram of the lens located in a position closest to the enlargement side in a first optical system, a deflector, and a second optical system.

FIG. 2 is a light ray diagram diagrammatically showing the entire projection system according to Example 1. FIG. 2 diagrammatically shows light fluxes F1 to F3, which exit out of a projection system 3A according to the present example and reach the screen S. The light flux F1 is a light flux that reaches a smallest image height position. The light flux F3 is a light flux that reaches a largest image height position. The light flux F2 is a light flux that reaches a position between the position that the light flux F1 reaches and the position that the light flux F3 reaches. FIG. 3 is a light ray diagram of the projection system 3A according to Example 1. FIG. 4 is a light ray diagram of the lens located in a position closest to the enlargement side in a first optical system, a deflector, and a second optical system.

The projection system 3A includes a first optical system 31 and a second optical system 32 sequentially arranged from the reduction side toward the enlargement side, as shown in FIG. 3. The projection system 3A further includes a deflector 33, which is disposed between the first optical system 31 and the second optical system 32 and deflects the optical path between the first optical system 31 and the second optical system 32. The deflector 33 is a flat mirror. In the present example, the deflector 33 has no power. The deflector 33 deflects the optical path by 90° between the first optical system 31 and the second optical system 32.

The first optical system 31 is a refractive optical system including a plurality of lenses. The second optical system 32 is formed of a single optical element 34. The optical element 34 has a first transmissive surface 41, a concave reflection surface 42, and a second transmissive surface 43 arranged in the presented order from the reduction side. The first transmissive surface 41 has a convex shape protruding toward the reduction side. The second transmissive surface 43 has a convex shape protruding toward the enlargement side. The optical element 34 is so disposed that a second optical axis M of the reflection surface 42 intersects a first optical axis N of the first optical system 31.

The liquid crystal panels 18 of the image formation section 2 are disposed in the reduction-side image formation plane of the projection system 3A. The liquid crystal panels 18 form the projection images on one side of the first optical axis N of the first optical system 31 in a plane perpendicular to the first optical axis N. The screen S is disposed in the enlargement-side image formation plane of the projection system 3A. An intermediate image 35 conjugate with the reduction-side image formation plane is formed between the first optical system 31 and the reflection surface 42 of the optical element 34. The intermediate image 35 is conjugate also with the enlargement-side image formation plane. In the present example, the intermediate image 35 is formed inside the optical element. That is, the intermediate image 35 is formed between the first transmissive surface 41 and the reflection surface 42 of the optical element 34.

In the following description, three axes perpendicular to one another are called axes X, Y (first axis), and Z for convenience. The width direction of the screen S, which is the enlargement-side image formation plane, is called an axis-X direction, the upward/downward direction of the screen S is called an axis-Y direction, and the direction perpendicular to the screen S is called an axis-Z direction. The plane containing the first optical axis N of the first optical system 31 and the second optical axis M of the reflection surface 42 of the optical element 34 is called a plane YZ.

In the present example, the first optical axis N of the first optical system 31 extends in the Y-axis direction. The deflector 33 inclines by 45° with respect to the axes Y and Z. The second optical axis M of the reflection surface 42 of the optical element 34 extends in the Z-axis direction. That is, the angle between the second optical axis M of the reflection surface 42 of the optical element 34 and the first optical axis N of the first optical system 31 is 90°. FIGS. 2, 3, and 4 are each a light ray diagram in the plane YZ. The liquid crystal panels 18 form the projection images on the side opposite the screen S with respect to the first optical axis N of the first optical system 31.

The first optical system 31 includes the cross dichroic prism 19 and 14 lenses L1 to L14, as shown in FIG. 3. The lenses L1 to L14 are arranged in the presented order from the reduction side toward the enlargement side. In the present example, the lenses L2 and L3 are bonded to each other into a first doublet L21. The lenses L4 and L5 are bonded to each other into a second doublet L22. The lenses L9 and L10 are bonded to each other into a third doublet L23. An aperture O is disposed between the lens L7 and the lens L8.

The optical element 34 is designed by using the second optical axis M of the reflection surface 42 as the axis in the design stage. In other words, the second optical axis M is the design-stage optical axis of the first transmissive surface 41, the second transmissive surface 43, and the reflection surface 42. The second optical axis M of the reflection surface 42 extends along the axis Z, as shown in FIG. 4. The first transmissive surface 41 and the reflection surface 42 are located on a lower side Y2 of the second optical axis M, and the second transmissive surface 43 is located on an upper side Y1 of the second optical axis M. In the present example, the first transmissive surface 41, the reflection surface 42, and the second transmissive surface 43 of the optical element 34 each have a shape rotationally symmetric around the second optical axis M of the reflection surface 42 as the axis of rotation. The first transmissive surface 41 and the second transmissive surface 43 therefore form a rotationally symmetric shape. The first transmissive surface 41, the reflection surface 42, and the second transmissive surface 43 of the optical element 34 are each an aspheric surface. The reflection surface 42 is a reflection coating layer provided on a surface of the optical element 34 that is the surface opposite the first transmissive surface 41. The aspheric surfaces are each a free-form surface in some cases. Also in this case, the free-form surfaces are designed by using the second optical axis M as the design-stage axis.

A pupil P of the second optical system 32 is located inside the optical element 34, as shown in FIG. 4. The pupil P of the second optical system 32 in the plane YZ is defined by the line that connects an upper intersection 53, where an upper peripheral light ray 51a of an upper end light flux 51 passing through the axis-Y-direction upper end of an effective light ray range 50 of the second transmissive surface 43 and an upper peripheral light ray 52a of a lower end light flux 52 passing through the axis-Y-direction lower end of the effective light ray range 50 intersect each other in the plane YZ, to a lower intersection 54, where a lower peripheral light ray 51b of the upper end light flux 51 and a lower peripheral light ray 52b of the lower end light flux 52 intersect each other in the plane YZ. The pupil P inclines with respect to an imaginary vertical line V perpendicular to the second optical axis M of the reflection surface 42 in the plane YZ.

The deflector 33 overlaps with part of the optical element 34 when viewed in the axis-Z direction, as shown in FIG. 4. Specifically, the deflector 33 is so disposed relative to the optical element 34 that an upper end 36 of the deflector 33 that is the upper end in the Y-axis direction is located below in the axis-Y direction the lower peripheral light ray 52b of the lower end light flux 52 passing through the axis-Y-direction lower end of the effective light ray range 50 of the second transmissive surface 43.

The optical path length from an enlargement-side first surface 71 of the lens L14 (first lens) located in a position closest to the enlargement side in the first optical system 31 to the first transmissive surface 41 of the optical element 34 is smaller than the diameter of the first surface 71 of the lens L14, as shown in FIG. 4. The optical path length is the axial inter-surface distance between the first surface 71 of the lens L14 and the first transmissive surface 41. The optical path length from the first surface 71 of the lens L14 to the first transmissive surface 41 is also smaller than the diameter of the optical element 34. In other words, the optical path length between the lens L14 and the first transmissive surface 41 is smaller than the diameter of the second transmissive surface 43.

Lens Data

Data on the lenses of the projection system 3A are listed below. The surfaces of the lenses are numbered sequentially from the reduction side toward the enlargement side. Reference characters are given to the lenses, the deflector, the first transmissive surface, the reflection surface, and the second transmissive surface. Data labeled with a surface number that does not correspond to any of the lenses, the deflector, the first transmissive surface, the reflection surface, and the second transmissive surface is dummy data. Reference character R denotes the radius of curvature. Reference character D denotes the axial inter-surface distance. Reference character C denotes the aperture radius, and twice the aperture radius is the diameter of the lens surface. Reference characters R, D, and C are each expressed in millimeters.

| Reference character | Surface number | Shape | R | D | Glass material | Refraction/reflection | C |
|---|---|---|---|---|---|---|---|
| 18 | 0 | Spherical | Infinity | 5.0771 | | Refraction | 0.0000 |
| 19 | 1 | Spherical | Infinity | 21.5089 | SBSL7_OHARA | Refraction | 7.6247 |
| | 2 | Spherical | Infinity | 3.0000 | | Refraction | 9.3606 |
| | 3 | Spherical | Infinity | 0.0000 | | Refraction | 9.7298 |
| | 4 | Spherical | Infinity | 0.0000 | | Refraction | 9.7298 |
| | 5 | Spherical | Infinity | 0.0000 | | Refraction | 9.7298 |
| L1 | 6 | Spherical | 33.5245 | 4.9750 | 451767.7908 | Refraction | 9.9143 |
| | 7 | Spherical | −25.7550 | 0.1000 | | Refraction | 9.8932 |
| L2 | 8 | Spherical | 66.8570 | 4.7765 | 489548.5711 | Refraction | 9.2823 |
| L3 | 9 | Spherical | −16.6762 | 1.0000 | 836696.3786 | Refraction | 8.9880 |
| | 10 | Spherical | −53.0858 | 0.1000 | | Refraction | 8.9164 |
| L4 | 11 | Spherical | 65.2761 | 4.5431 | 450077.8059 | Refraction | 8.6367 |
| L5 | 12 | Spherical | −15.4257 | 1.0000 | 839236.3286 | Refraction | 8.3723 |
| | 13 | Spherical | −128.4896 | 0.1000 | | Refraction | 8.4006 |

-continued

| Reference character | Surface number | Shape | R | D | Glass material | Refraction/reflection | C |
|---|---|---|---|---|---|---|---|
| L6 | 14 | Spherical | 54.7227 | 2.3878 | 846663.2378 | Refraction | 8.3609 |
|  | 15 | Spherical | −137.8214 | 0.5101 |  | Refraction | 8.2228 |
| L7 | 16 | Spherical | −45.2553 | 2.3755 | 444638.8595 | Refraction | 8.2223 |
|  | 17 | Spherical | −21.2539 | 11.0686 |  | Refraction | 8.0771 |
| O | 18 | Spherical | Infinity | 7.8486 |  | Refraction | 6.2325 |
| L8 | 19 | Spherical | −11.9123 | 1.0000 | 437001.951 | Refraction | 5.9864 |
|  | 20 | Spherical | −13.9480 | 6.3146 |  | Refraction | 6.3585 |
| L9 | 21 | Spherical | 46.4698 | 6.5007 | 648501.3148 | Refraction | 8.7526 |
| L10 | 22 | Spherical | −11.5110 | 1.0000 | 843577.2685 | Refraction | 8.8745 |
|  | 23 | Spherical | 29.9526 | 1.5880 |  | Refraction | 10.1837 |
| L11 | 24 | Spherical | 265.4698 | 7.5224 | 658614.3083 | Refraction | 10.1825 |
|  | 25 | Spherical | −13.1337 | 0.1000 |  | Refraction | 10.9180 |
| L12 | 26 | Spherical | −13.6596 | 1.0000 | 755000.5232 | Refraction | 10.9175 |
|  | 27 | Spherical | −24.5937 | 0.1000 |  | Refraction | 12.4210 |
| L13 | 28 | Aspheric | 21.5855 | 3.5898 | E48R ZEON | Refraction | 14.8206 |
|  | 29 | Aspheric | 36.5832 | 5.7208 |  | Refraction | 15.1878 |
| L14 | 30 | Aspheric | −157.3922 | 3.5898 | E48R_ZEON | Refraction | 15.4993 |
|  | 31 | Aspheric | 56.7689 | 0.1292 |  | Refraction | 16.6387 |
|  | 32 | Spherical | Infinity | 20.0000 |  | Refraction | 16.6543 |
| 33 | 33 | Spherical | Infinity | 0.0000 |  | Reflection | 23.5657 |
|  | 34 | Spherical | Infinity | −6.0000 |  | Refraction | 16.7091 |
| 41 | 35 | Aspheric | −36.3858 | −23.4735 | Z330R ZEON | Refraction | 16.7435 |
|  | 36 | Spherical | Infinity | 0.0000 | Z330R_ZEON | Refraction | 12.3233 |
| 42 | 37 | Aspheric | 12.9213 | 0.0000 | Z330R_ZEON | Reflection | 13.2928 |
|  | 38 | Spherical | Infinity | 23.4735 | Z330R_ZEON | Refraction | 23.2518 |
| 43 | 39 | Aspheric | −36.3858 | 65.8130 |  | Refraction | 18.0836 |
|  | 40 | Spherical | Infinity | 56.8385 |  | Refraction | 293.2386 |
|  | 41 | Spherical | Infinity | 180.0883 |  | Refraction | 503.7218 |
| S | 42 | Spherical | Infinity | 0.0000 |  | Refraction | 1170.6212 |

The aspheric coefficients of each of the aspheric surfaces are listed below.

| Surface number | S28 | S29 | S30 | S31 |
|---|---|---|---|---|
| Radius of curvature in axis-Y direction | 21.58550076 | 36.58324567 | −157.3921587 | 56.76893916 |
| Conic constant (k) | 0.263116414 | −9.155361932 | 90 | 0 |
| Fourth-order coefficient (A) | −5.49056E−05 | −1.07810E−05 | −7.03726E−05 | −1.60989E−04 |
| Sixth-order coefficient (B) | −3.93188E−08 | −3.04961E−07 | −3.11634E−07 | 2.69163E−07 |
| Eighth-order coefficient (C) | −3.78918E−10 | 5.37969E−10 | 1.38410E−09 | −2.45133E−10 |
| Tenth-order coefficient (D) |  |  |  |  |
| Twelfth-order coefficient (E) |  |  |  |  |

| Surface number | S35 | S37 | S39 |
|---|---|---|---|
| Radius of curvature in axis-Y direction | −36.38584736 | 12.92129861 | −36.38584736 |
| Conic constant (k) | 2.48402187 | −4.424620059 | 2.48402187 |
| Fourth-order coefficient (A) | −3.62599E−05 | 5.93830E−05 | −3.62599E−05 |
| Sixth-order coefficient (B) | 1.62023E−07 | −5.35444E−07 | 1.62023E−07 |
| Eighth-order coefficient (C) | −5.50034E−10 | 2.05204E−09 | −5.50034E−10 |
| Tenth-order coefficient (D) | 9.55919E−13 | −3.79129E−12 | 9.55919E−13 |
| Twelfth-order coefficient (E) | −8.32888E−16 |  | −8.32888E−16 |

Factors of the projection system 3A are listed below: a maximum object height; the numerical aperture; the distance in the second optical axis from the first optical axis to the reflection surface; the quotient of the operation of dividing the distance in the second optical axis from the first optical axis to the reflection surface by the maximum object height of the projection system 3A; the distance in the axis-Z direction from the reflection surface to the outermost shape of the deflector; the quotient of the operation of dividing the distance in the axis-Z direction from the reflection surface to the outermost shape of the deflector by the maximum object height of the projection system 3A; the overall length of the projection system 3A in the axis-Y direction; the quotient of the operation of dividing the overall length of the projection system 3A in the axis-Y direction by the maximum object height of the projection system 3A; and TR. The maximum in an image formation region of the surface of each of the liquid crystal panels 18. The maximum object height is expressed in millimeters. The numerical aperture is abbreviated to NA. The distance in the second optical axis from the first optical axis to the reflection surface is Wh, which is the distance in millimeters in the second optical axis M from the first optical axis N to the reflection surface 42, as shown in FIG. 3. The distance in the axis-Z direction from the reflection surface to the outermost shape of the deflector is Wa, which is the distance in millimeters in the axis-Z direction from the reflection surface 42 to the deflector 33, as shown in FIG. 3. The overall length of the projection system 3A in the axis-Y direction is T, which is the distance in millimeters in the axis-Y direction from the liquid crystal panels 18 to an end of the optical element 34 that is the end on the upper side Y1, as shown in FIG. 3. TR stands for a throw ratio and is the quotient of the operation of dividing the projection distance by the axis-X-direction dimension of a projection image projected on the screen S.

| Maximum object height (y) | 7.0 |
|---|---|
| NA | 0.286 |
| Wh | 29.5 |
| Wh/y | 4.21 |
| Wa | 45.0 |
| Wa/y | 6.4 |
| T | 146.6 |
| T/y | 20.9 |
| TR (0.37" 16:9LV) | 0.220 |

When the value of Wh/y is smaller than or equal to 5.5 in the projection system 3A, the size of the projection system 3A in the axis-Z direction can be suppressed, whereby the projection system 3A can be compact. When the value of Wh/y is greater than or equal to 3, the projection system 3A is readily designed. In the projection system 3A according to the present example, Wh/y is 4.21.

Effects and Advantages

The projection system 3A according to the present example includes the first optical system 31, the second optical system 32, and the deflector 33, which is located between the first optical system 31 and the second optical system 32 and deflects the optical path of the projection system 3A. The second optical system. 32 includes the optical element having the first transmissive surface 41, the concave reflection surface 42, and the second transmissive surface 43 arranged in the presented order from the reduction side.

Therefore, in the second optical system 32 of the projection system 3A according to the present example, the second transmissive surface 43 can refract the light flux reflected off the reflection surface 42. The projection distance of the projection system 3A is therefore readily shortened as compared with a case where the second optical system 32 has only the reflection surface 42. In other words, the projection system 3A according to the present example can have a short focal length as compared with the case where the second optical system has only the reflection surface.

Since the optical element 34 has the convex second transmissive surface 43 protruding toward the enlargement side, shortening the projection distance does not cause an increase in the size of the reflection surface 42 disposed on the enlargement side of the intermediate image 35. That is, the second transmissive surface 43, which can refract the light flux, can suppress inclination of the intermediate image 35, which is conjugate with the screen S, with respect to the second optical axis M of the reflection surface 42 and the resultant increase in the size of the intermediate image 35. An increase in the size of the reflection surface 42, which is located on the enlargement side of the intermediate image 35, can therefore be suppressed.

Further, the projection system 3A includes the deflector 33, which deflects the optical path between the first optical system 31 and the second optical system 32. Therefore, the orientation of the light flux that exits out of the second optical system 32 can be freely set as compared with a case where the projection system includes no deflector. The light flux that exits out of the second optical system 32 is thus readily oriented in a direction in which the light flux does not interfere with the first optical system 31.

In the present example, the deflector 33 disposed as described above deflects the optical path by 90° between the first optical system 31 and the second optical system 32. In other words, the deflector 33 disposed as described above sets the angle between the first optical axis N of the first optical system 31 and the second optical axis M of the reflection surface 42 at 90°. There is therefore no need to provide an unnecessary space for avoiding interference between the light reflected off the reflection surface 42 and the first optical system 31, whereby an increase in the dimension of the projection system 3A in the axis-Z direction can be suppressed.

In the present example, the intermediate image 35 is located between the first transmissive surface 41 and the reflection surface 42 of the optical element 34. The first optical system 31 and the optical element 34 are therefore allowed to approach each other as compared with a case where the intermediate image 35 is formed between the first optical system 31 and the optical element 34. The projection system 3A can therefore be compact.

Further, in the present example, the optical path length from the enlargement-side first surface 71 of the lens L14 (first lens) located in a position closest to the enlargement side in the first optical system 31 to the first transmissive surface 41 of the optical element 34 is smaller than twice the effective diameter of the first surface 71 of the lens L14. The deflector 33 is therefore disposed in a position relatively close to the first optical system 31. The optical path length from the first surface 71 of the lens L14 to the first transmissive surface 41 is also smaller than the diameter of the optical element 34. The deflector 33 is therefore disposed in a position relatively close to the second optical system 32. The size of the projection system 3A is therefore readily reduced.

The first transmissive surface 41, the reflection surface 42, and the second transmissive surface 43 of the optical element 34 each have a shape rotationally symmetric around the second optical axis M of the reflection surface 42 as the axis of rotation. The optical element 34 is therefore readily manufactured. Further, since the optical element 34 has a rotationally symmetric shape, the optical element 34 is manufactured at an improved yield as compared with a case where the optical element 34 has no rotationally symmetric shape.

The pupil P of the second optical system 32 inclines with respect to the imaginary vertical line V perpendicular to the second optical axis M of the reflection surface 42. A decrease in the amount of light at a periphery of the screen S that is the periphery on the upper side Y1 can therefore be suppressed as compared with a case where the pupil P of the second optical system 32 is parallel to the imaginary vertical line V. That is, in the configuration in which the pupil P inclines with respect to the imaginary vertical line V perpendicular to the second optical axis M, the amount of light flux F1, which reaches the upper portion of the screen S, increases as compared with the case where the pupil P is parallel to the imaginary vertical line V. Further, when the amount of light flux F1, which reaches the upper portion of the screen S, increases, the difference in the amount of light between the light flux F1 and the light flux F3, which reaches the lower portion of the screen S, decreases. A decrease in the amount of light at the upper periphery of the screen S as compared with that at the lower periphery of the screen S can therefore be suppressed.

Further, in the optical element 34 in the present example, the first transmissive surface 41, which is located on the reduction side of the intermediate image 35, is an aspheric surface, whereby occurrence of aberrations at the intermediate image 35 is readily suppressed. The reflection surface 42 and the second transmissive surface 43 of the optical element 34 are each an aspheric surface. Occurrence of aberrations is therefore readily suppressed in the enlargement-side image formation plane.

In the projection system, a lens may be further disposed on the enlargement side of the second optical system.

Figure 5:
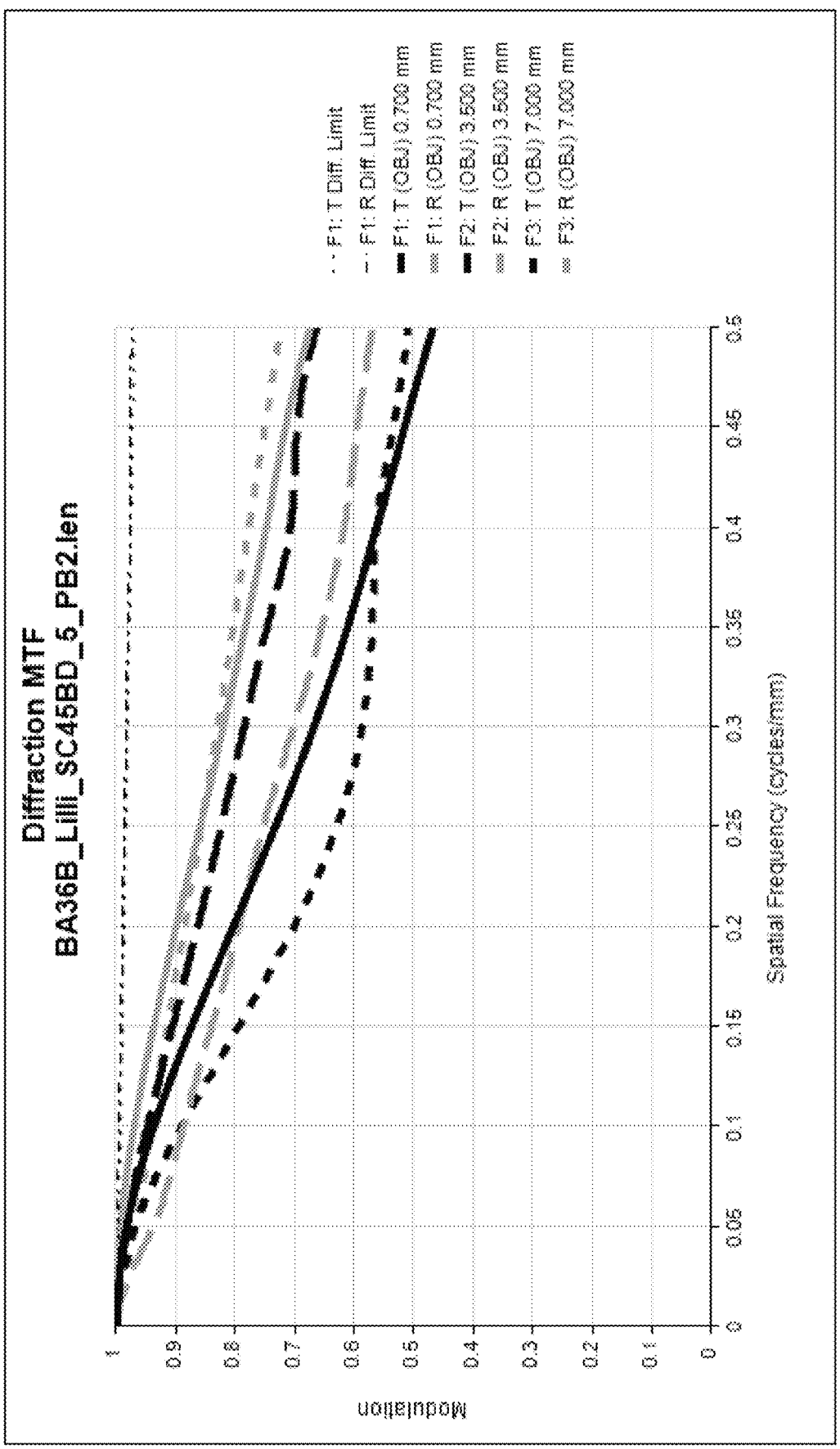
FIG. 5 shows the enlargement-side MTF of the projection system according to Example 1.

FIG. 5 shows the enlargement-side MTF of the projection system 3A. The horizontal axis of FIG. 5, which shows the MTF, represents the spatial frequency. The vertical axis of FIG. 5 represents a contrast reproduction ratio. In FIG. 5, the black graphs represent tangential light rays (T), and the gray graphs represent radial light rays (R). Out of the tangential light rays (T) and the radial light rays (R), the solid lines represent the light flux F1, the long-line-segment broken lines represent the light flux F2, and the broken lines represent the light flux F3. The projection system 3A according to the present example provides high resolution, as shown in FIG. 5.

Example 2

Figure 6:
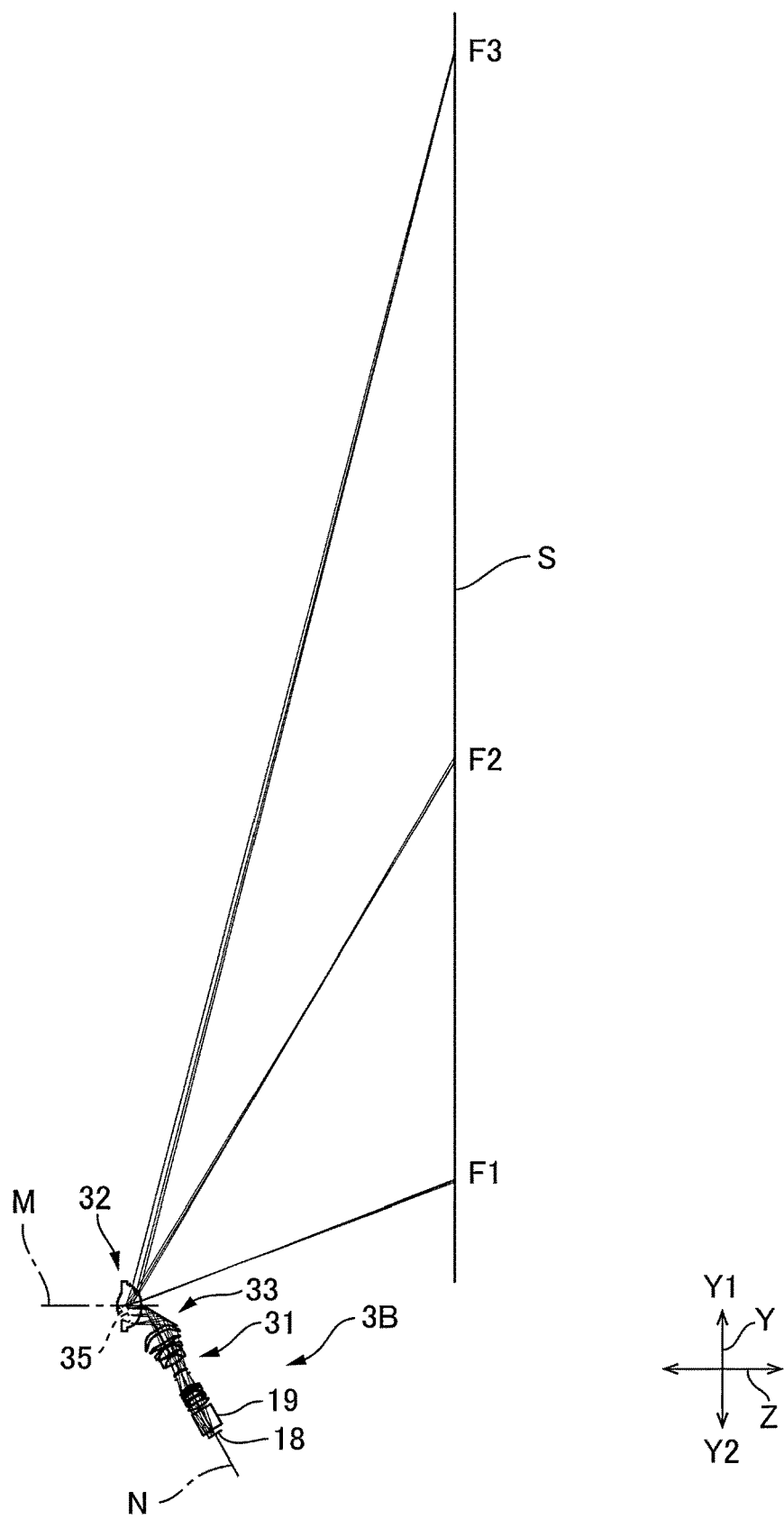
FIG. 6 is a light ray diagram diagrammatically showing the entire projection system according to Example 2.
Figure 7:
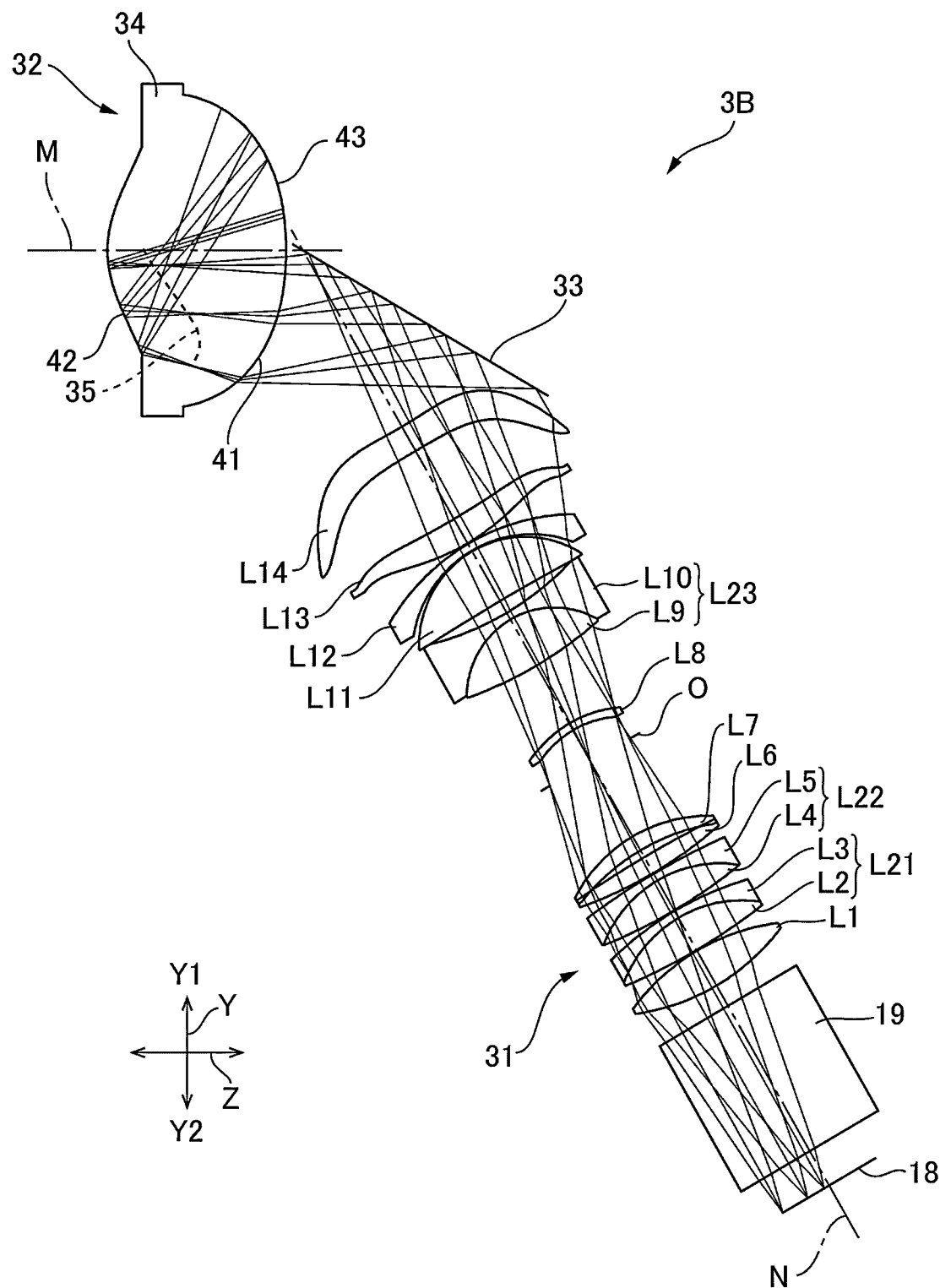
FIG. 7 is a light ray diagram of the projection system according to Example 2.
Figure 8:
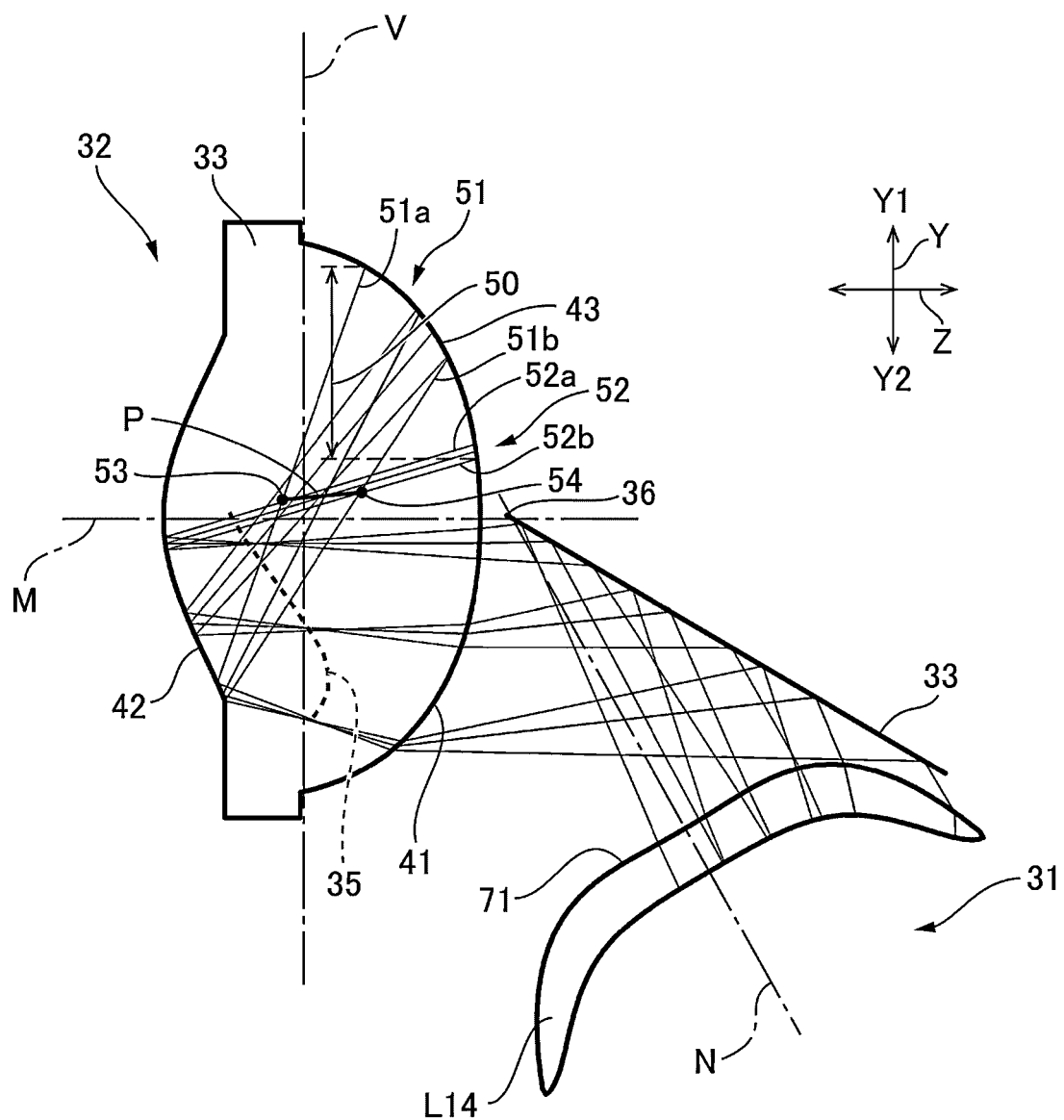
FIG. 8 is a light ray diagram of the lens located in a position closest to the enlargement side in the first optical system, the deflector, and the second optical system.

FIG. 6 is a light ray diagram diagrammatically showing the entire projection system according to Example 2. FIG. 6 diagrammatically shows the light fluxes F1 to F3, which exit out of a projection system 3B according to the present example and reach the screen S. The light flux F1 is a light flux that reaches a smallest image height position. The light flux F3 is a light flux that reaches a largest image height position. The light flux F2 is a light flux that reaches a position between the position that the light flux F1 reaches and the position that the light flux F3 reaches. FIG. 7 is a light ray diagram of the projection system 3B according to Example 2. FIG. 8 is a light ray diagram of the lens located in a position closest to the enlargement side in the first optical system, the deflector, and the second optical system.

The projection system 3B according to the present example includes the first optical system 31 and the second optical system 32 sequentially arranged from the reduction side toward the enlargement side, as shown in FIG. 7. The projection system 3B further includes the deflector 33, which is located between the first optical system 31 and the second optical system 32 and deflects the optical path between the first optical system 31 and the second optical system 32. The deflector 33 is a flat mirror. In the present example, the deflector 33 has no power. The deflector 33 deflects the optical path by 90° between the first optical system 31 and the second optical system 32.

The first optical system 31 is a refractive optical system including a plurality of lenses. The second optical system 32 is formed of the single optical element 34. The optical element 34 has the first transmissive surface 41, the concave reflection surface 42, and the second transmissive surface 43 arranged in the presented order from the reduction side. The first transmissive surface 41 has a convex shape protruding toward the reduction side. The second transmissive surface 43 has a convex shape protruding toward the enlargement side. The optical element 34 is so disposed that the second optical axis M of the reflection surface 42 intersects a first optical axis N of the first optical system 31.

The liquid crystal panels 18 of the image formation section 2 are disposed in the reduction-side image formation plane of the projection system 3B. The liquid crystal panels 18 form the projection images on one side of the first optical axis N of the first optical system 31 in a plane perpendicular to the first optical axis N. The screen S is disposed in the enlargement-side image formation plane of the projection system 3B. The intermediate image 35 conjugate with the reduction-side image formation plane is formed between the first optical system 31 and the reflection surface 42 of the optical element 34. The intermediate image 35 is conjugate also with the enlargement-side image formation plane. In the present example, the intermediate image 35 is formed inside the optical element. That is, the intermediate image 35 is formed between the first transmissive surface 41 and the reflection surface 42 of the optical element 34.

In the present example, the second optical axis M of the reflection surface 42 of the optical element 34 extends in the Z-axis direction. The first optical axis N of the first optical system 31 inclines counterclockwise with respect to the axis-Y direction. The angle between the first optical axis N of the first optical system 31 and the second optical axis M of the reflection surface 42 is 120°, which is greater than 90°, as shown in FIG. 7. FIGS. 6, 7, and 8 are each a light ray diagram in the plane YZ.

The first optical system 31 includes the cross dichroic prism 19 and 14 lenses L1 to L14, as shown in FIG. 7. The lenses L1 to L14 are arranged in the presented order from the reduction side toward the enlargement side. In the present example, the lenses L2 and L3 are bonded to each other into the first doublet L21. The lenses L4 and L5 are bonded to each other into the second doublet L22. The lenses L9 and L10 are bonded to each other into the third doublet L23. The aperture O is disposed between the lens L7 and the lens L8.

The optical element 34 is designed by using the second optical axis M of the reflection surface 42 as the axis in the design stage. In other words, the second optical axis M is the design-stage optical axis of the first transmissive surface 41, the second transmissive surface 43, and the reflection surface 42. The second optical axis M of the reflection surface 42 extends along the axis Z, as shown in FIG. 8. The first transmissive surface 41 and the reflection surface 42 are located on the lower side Y2 of the second optical axis M, and the second transmissive surface 43 is located on the upper side Y1 of the second optical axis M. In the present example, the first transmissive surface 41, the reflection surface 42, and the second transmissive surface 43 of the optical element each have a shape rotationally symmetric around the second optical axis M of the reflection surface 42 as the axis of rotation. The first transmissive surface 41 and the second transmissive surface 43 therefore form a rotationally symmetric shape. The first transmissive surface 41, the reflection surface 42, and the second transmissive surface 43 of the optical element 34 are each an aspheric surface. The reflection surface 42 is a reflection coating layer provided on a surface of the optical element 34 that is the surface opposite the first transmissive surface 41. The aspheric surfaces are each a free-form surface in some cases. Also in this case, the free-form surfaces are designed by using the second optical axis M as the design-stage axis.

The pupil P of the second optical system 32 is located inside the optical element 34, as shown in FIG. 8. The pupil P of the second optical system 32 in the plane YZ is defined by the line that connects the upper intersection 53, where the upper peripheral light ray 51a of the upper end light flux 51 passing through the axis-Y-direction upper end of the effective light ray range 50 of the second transmissive surface 43 and the upper peripheral light ray 52a of the lower end light flux 52 passing through the axis-Y-direction lower end of the effective light ray range 50 intersect each other in the plane YZ, to the lower intersection 54, where the lower peripheral light ray 51b of the upper end light flux 51 and the lower peripheral light ray 52b of the lower end light flux 52 intersect each other in the plane YZ. The pupil P inclines with respect to the imaginary vertical line V perpendicular to the second optical axis M of the reflection surface 42 in the plane YZ.

The deflector 33 overlaps with part of the optical element 34 when viewed in the axis-Z direction, as shown in FIG. 8. Specifically, the deflector 33 is so disposed relative to the optical element 34 that the upper end 36 of the deflector 33 that is the upper end in the Y-axis direction is located below in the axis-Y direction the lower peripheral light ray 52*b* of the lower end light flux 52 passing through the axis-Y-direction lower end of the effective light ray range 50 of the second transmissive surface 43.

Lens Data

Data on the lenses of the projection system 3B are listed below. The surfaces of the lenses are numbered sequentially from the reduction side toward the enlargement side. Reference characters are given to the lenses, the deflector, the first transmissive surface, the reflection surface, and the second transmissive surface. Data labeled with a surface number that does not correspond to any of the lenses, the deflector, the first transmissive surface, the reflection surface, and the second transmissive surface is dummy data. Reference character R denotes the radius of curvature. Reference character D denotes the axial inter-surface distance. Reference character C denotes the aperture radius, and twice the aperture radius is the diameter of the lens surface. Reference characters R, D, and C are each expressed in millimeters.

| Reference character | Surface number | Shape | R | D | Glass material | Refraction/reflection | C |
|---|---|---|---|---|---|---|---|
| 18 | 0 | Spherical | Infinity | 5.0771 | | Refraction | 0.0000 |
| 19 | 1 | Spherical | Infinity | 21.5089 | SBSL7_OHARA | Refraction | 7.6465 |
| | 2 | Spherical | Infinity | 3.0000 | | Refraction | 9.4425 |
| | 3 | Spherical | Infinity | 0.0000 | | Refraction | 9.8246 |
| | 4 | Spherical | Infinity | 0.0000 | | Refraction | 9.8246 |
| | 5 | Spherical | Infinity | 0.0000 | | Refraction | 9.8246 |
| L1 | 6 | Spherical | 28.8271 | 5.1536 | 452356.7857 | Refraction | 10.0551 |
| | 7 | Spherical | −28.1017 | 0.1000 | | Refraction | 10.0084 |
| L2 | 8 | Spherical | 78.8843 | 4.7704 | 456868.7491 | Refraction | 9.4217 |
| L3 | 9 | Spherical | −16.7422 | 1.0000 | 837952.3521 | Refraction | 9.1250 |
| | 10 | Spherical | −42.7163 | 0.1000 | | Refraction | 9.1033 |
| L4 | 11 | Spherical | 70.0583 | 4.4189 | 451345.7945 | Refraction | 8.7649 |
| L5 | 12 | Spherical | −16.4117 | 1.0000 | 837687.3573 | Refraction | 8.4920 |
| | 13 | Spherical | −93.9826 | 0.1000 | | Refraction | 8.4762 |
| L6 | 14 | Spherical | 55.4651 | 2.3579 | 846663.2378 | Refraction | 8.3790 |
| | 15 | Spherical | −152.2211 | 1.0184 | | Refraction | 8.2034 |
| L7 | 16 | Spherical | −27.8181 | 2.0344 | 442924.8782 | Refraction | 8.2026 |
| | 17 | Spherical | −19.8208 | 11.0686 | | Refraction | 8.0771 |
| O | 18 | Spherical | Infinity | 4.6481 | | Refraction | 6.1589 |
| L8 | 19 | Spherical | −13.3615 | 1.0000 | 437001.951 | Refraction | 5.8000 |
| | 20 | Spherical | −16.0364 | 8.5746 | | Refraction | 6.1452 |
| L9 | 21 | Spherical | 52.3826 | 6.8248 | 613135.3421 | Refraction | 9.0128 |
| L10 | 22 | Spherical | −11.4926 | 1.0000 | 842907.2763 | Refraction | 9.1518 |
| | 23 | Spherical | 38.4604 | 1.7271 | | Refraction | 10.7385 |
| L11 | 24 | Spherical | −297.1463 | 7.3537 | 657611.3089 | Refraction | 10.7420 |
| | 25 | Spherical | −13.9865 | 0.1000 | | Refraction | 11.5142 |
| L12 | 26 | Spherical | −15.7568 | 1.0000 | 755000.5232 | Refraction | 11.5827 |
| | 27 | Spherical | −28.7176 | 0.1000 | | Refraction | 12.9300 |
| L13 | 28 | Aspheric | 29.1171 | 3.5898 | E48R_ZEON | Refraction | 14.7821 |
| | 29 | Aspheric | 119.3209 | 10.0763 | | Refraction | 15.2519 |
| L14 | 30 | Aspheric | −234.7807 | 3.5898 | E48R_ZEON | Refraction | 16.8886 |
| | 31 | Aspheric | 67.8338 | 6.0357 | | Refraction | 17.7670 |
| | 32 | Spherical | Infinity | 20.0000 | | Refraction | 17.4626 |
| 33 | 33 | Spherical | Infinity | 0.0000 | | Reflection | 35.3567 |
| | 34 | Spherical | Infinity | −2.1986 | | Refraction | 17.0563 |
| 41 | 35 | Aspheric | −38.6804 | −23.4735 | Z330R_ZEON | Refraction | 16.8787 |
| | 36 | Spherical | Infinity | 0.0000 | Z330R_ZEON | Refraction | 12.2859 |
| 42 | 37 | Aspheric | 13.0293 | 0.0000 | Z330R_ZEON | Reflection | 13.2997 |
| | 38 | Spherical | Infinity | 23.4735 | Z330R_ZEON | Refraction | 22.9284 |
| 43 | 39 | Aspheric | −38.6804 | 65.8130 | | Refraction | 18.2148 |
| | 40 | Spherical | Infinity | 56.8385 | | Refraction | 293.6181 |
| | 41 | Spherical | Infinity | 180.0883 | | Refraction | 504.2411 |
| S | 42 | Spherical | Infinity | 0.0000 | | Refraction | 1171.5833 |

The aspheric coefficients are listed below.

| Surface number | S28 | S29 | S30 | S31 |
|---|---|---|---|---|
| Radius of curvature in axis-Y direction | 29.11712414 | 119.320922 | −234.78067410 | −67.83379679 |
| Conic constant (k) | 1.797322179 | 55.52307423 | 90 | 0 |
| Fourth-order coefficient (A) | −1.30901E−05 | 1.63617E−05 | −8.30813E−05 | −1.54238E−04 |
| Sixth-order coefficient (B) | −2.18344E−07 | −3.88090E−07 | −2.02881E−07 | 2.29404E−07 |
| Eighth-order coefficient (C) | −2.87266E−10 | 4.48694E−10 | 7.85487E−10 | −3.18649E−10 |
| Tenth-order coefficient (D) | | | | |

-continued

| Twelfth-order coefficient (E) | | | |
|---|---|---|---|
| Surface number | S35 | S37 | S39 |
| Radius of curvature in axis-Y direction | −38.68037673 | 13.02927305 | −38.68037673 |
| Conic constant (k) | 2.692449382 | −4.616458455 | 2.692449382 |
| Fourth-order coefficient (A) | −4.92215E−05 | 6.34222E−05 | −4.92215E−05 |
| Sixth-order coefficient (B) | 2.93495E−07 | −5.69130E−07 | 2.93495E−07 |
| Eighth-order coefficient (C) | −1.28081E−09 | 2.15879E−09 | −1.28081E−09 |
| Tenth-order coefficient (D) | 2.91286E−12 | −3.94198E−12 | 2.91286E−12 |
| Twelfth-order coefficient (E) | −2.98528E−15 | | −2.98528E−15 |

The maximum object height, the numerical aperture, and TR of the projection system 3B are as follows: The maximum object height is the dimension from the first optical axis N of the projection system 3B to the farthest point therefrom in the image formation region of the surface of each of the liquid crystal panels 18. The maximum object height is expressed in millimeters. The numerical aperture is abbreviated to NA. TR stands for the throw ratio and is the quotient of the operation of dividing the projection distance by the axis-X-direction dimension of a projection image projected on the screen S.

| | |
|---|---|
| Maximum object height (y) | 7.0 |
| NA | 0.272 |
| TR (0.37" 16:9LV) | 0.221 |

Effects and Advantages

In the projection system 3B according to the present example, the first optical axis N of the first optical system 31 inclines with respect to the screen S. Although the size of the projection system 3B therefore increases in the axis-Z direction, the size of the projection system readily decreases in the axis-Y direction, whereby an effective space for accommodating components of the projector excluding the projection system can be ensured. The projection system 3B according to present example can provide the same effects and advantages as those provided by the projection system according to Example 1 excluding the effect described above.

Figure 9:
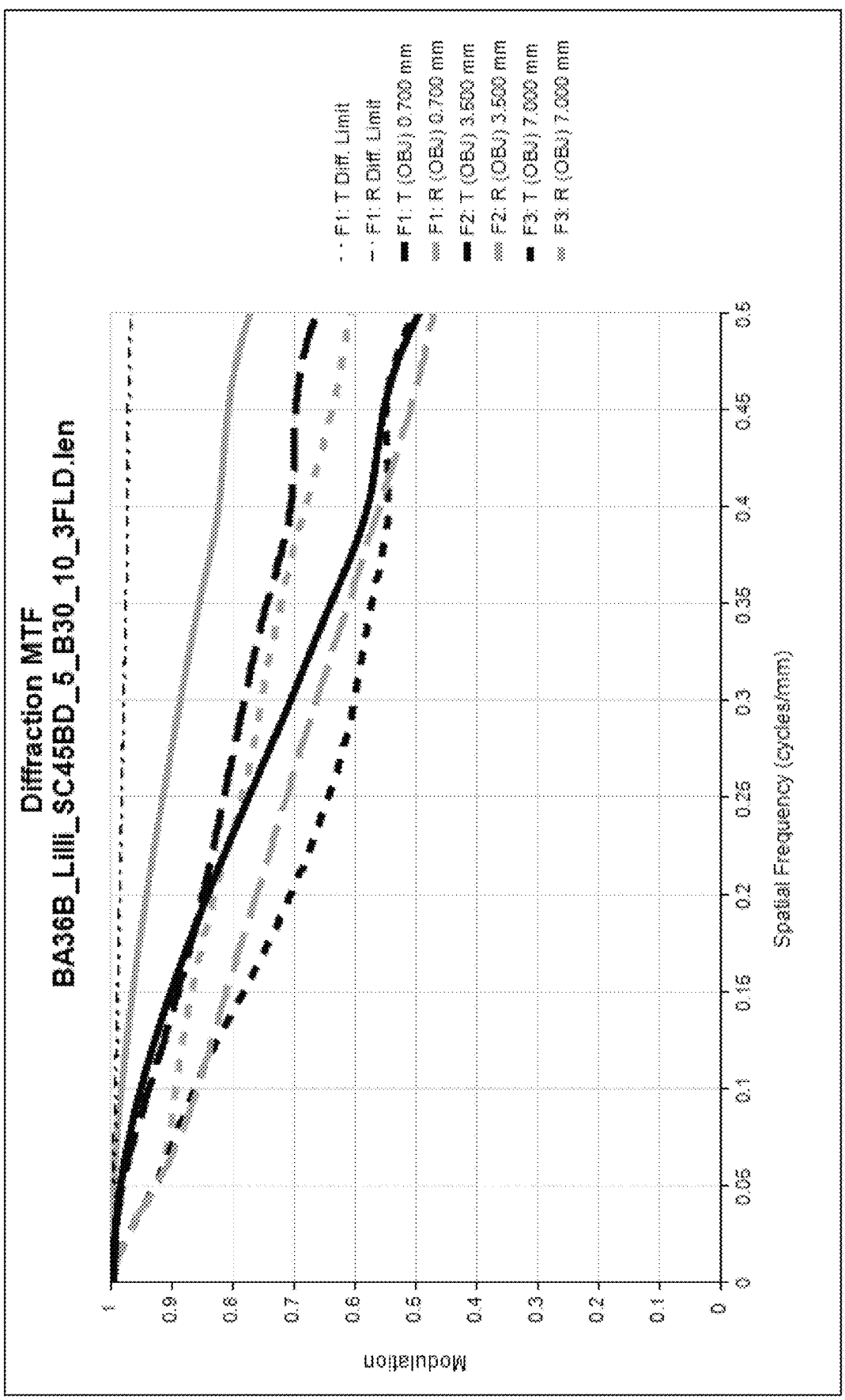
FIG. 9 shows the enlargement-side MTF of the projection system according to Example 2.

FIG. 9 shows the enlargement-side MTF of the projection system 3B. The projection system 3B according to the present example provides high resolution, as shown in FIG. 9.

Example 3

Figure 10:
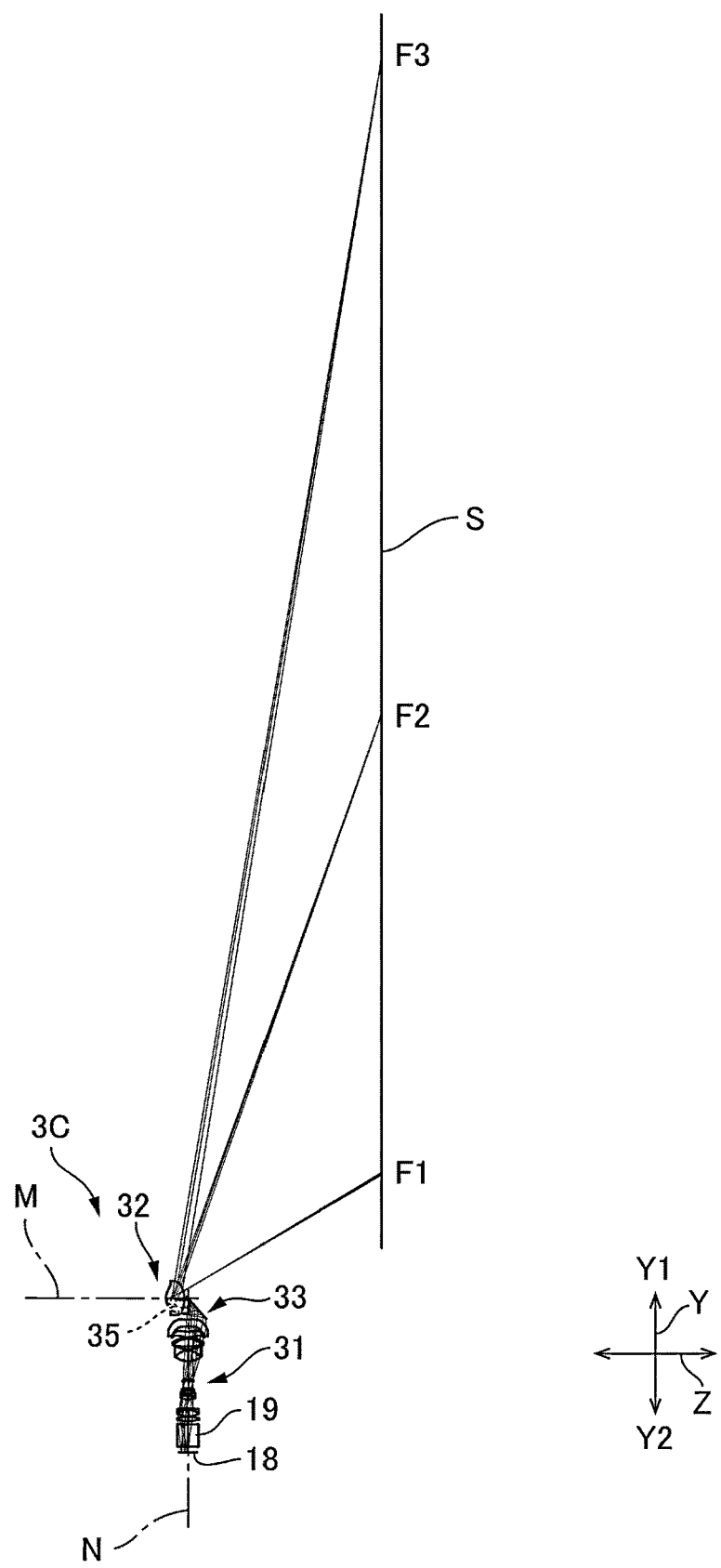
FIG. 10 is a light ray diagram diagrammatically showing the entire projection system according to Example 3.
Figure 11:
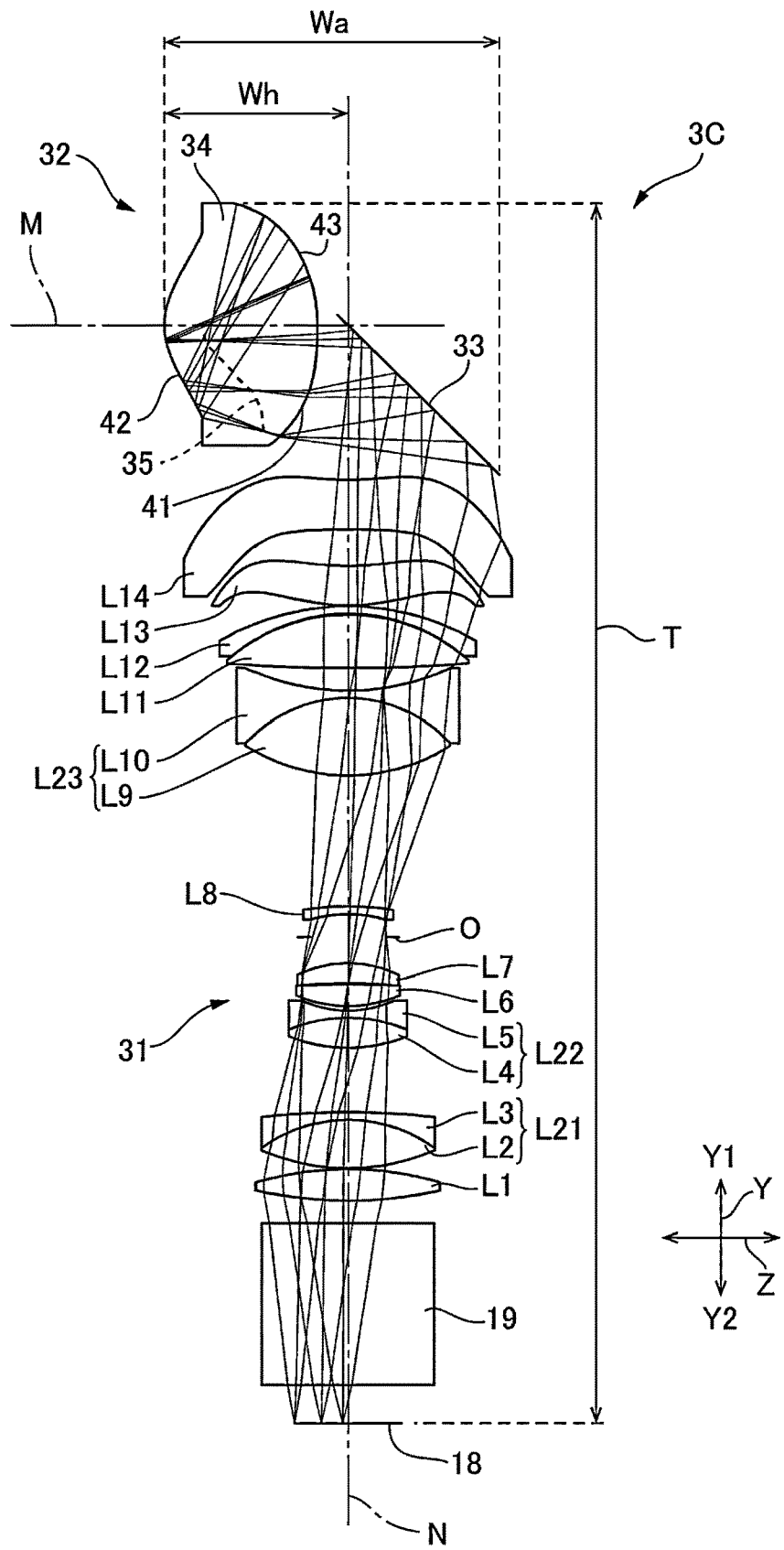
FIG. 11 is a light ray diagram of the projection system according to Example 3.
Figure 12:
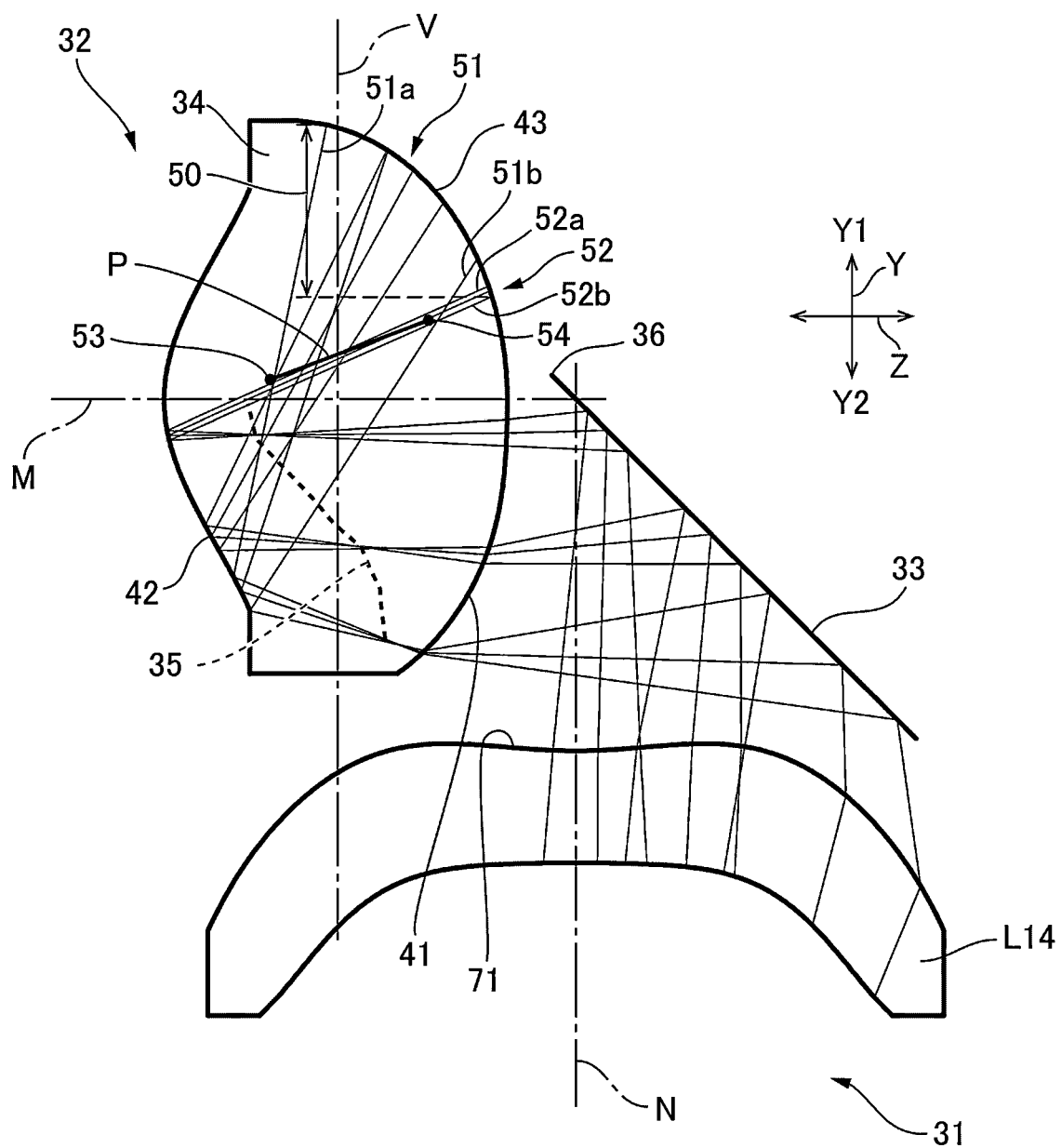
FIG. 12 is a light ray diagram of the lens located in a position closest to the enlargement side in the first optical system, the deflector, and the second optical system.

FIG. 10 is a light ray diagram diagrammatically showing the entire projection system according to Example 3. FIG. 10 diagrammatically shows the light fluxes F1 to F3, which exit out of a projection system 3C according to the present example and reach the screen S. The light flux F1 is a light flux that reaches a smallest image height position. The light flux F3 is a light flux that reaches a largest image height position. The light flux F2 is a light flux that reaches a position between the position that the light flux F1 reaches and the position that the light flux F3 reaches. FIG. 11 is a light ray diagram of the projection system 3C according to Example 3. FIG. 12 is a light ray diagram of the lens located in a position closest to the enlargement side in the first optical system, the deflector, and the second optical system.

The projection system 3C according to the present example includes the first optical system 31 and the second optical system 32 sequentially arranged from the reduction side toward the enlargement side, as shown in FIG. 11. The projection system 3C further includes the deflector 33, which is disposed between the first optical system 31 and the second optical system 32 and deflects the optical path between the first optical system 31 and the second optical system 32. The deflector 33 is a flat mirror. In the present example, the deflector 33 has no power. The deflector 33 deflects the optical path by 90° between the first optical system 31 and the second optical system 32.

The first optical system 31 is a refractive optical system including a plurality of lenses. The second optical system 32 is formed of the single optical element 34. The optical element 34 has the first transmissive surface 41, the concave reflection surface 42, and the second transmissive surface 43 arranged in the presented order from the reduction side. The first transmissive surface 41 has a convex shape protruding toward the reduction side. The second transmissive surface 43 has a convex shape protruding toward the enlargement side. The optical element 34 is so disposed that the second optical axis M of the reflection surface 42 intersects the first optical axis N of the first optical system 31.

The liquid crystal panels 18 of the image formation section 2 are disposed in the reduction-side image formation plane of the projection system 3C. The liquid crystal panels 18 form the projection images on one side of the first optical axis N of the first optical system 31 in a plane perpendicular to the first optical axis N. The screen S is disposed in the enlargement-side image formation plane of the projection system 3C. The intermediate image 35 conjugate with the reduction-side image formation plane is formed between the first optical system 31 and the reflection surface 42 of the optical element 34. The intermediate image 35 is conjugate also with the enlargement-side image formation plane. In the present example, the intermediate image 35 is formed inside the optical element. That is, the intermediate image 35 is formed between the first transmissive surface 41 and the reflection surface 42 of the optical element 34.

In the present example, the first optical axis N of the first optical system 31 extends in the Y-axis direction. The deflector 33 inclines by 45° with respect to the axes Y and Z. The second optical axis M of the reflection surface 42 of the optical element 34 extends in the Z-axis direction. That is, the angle between the second optical axis M of the reflection surface 42 of the optical element 34 and the first optical axis N of the first optical system 31 is 90°. FIGS. 10, 11, and 12 are each a ray diagram on the YZ plane. The liquid crystal panels 18 form the projection images on the side opposite the screen S with respect to the first optical axis N of the first optical system 31.

The first optical system 31 includes the cross dichroic prism 19 and 14 lenses L1 to L14, as shown in FIG. 11. The lenses L1 to L14 are arranged in the presented order from the reduction side toward the enlargement side. In the present example, the lenses L2 and L3 are bonded to each other into the first doublet L21. The lenses L4 and L5 are bonded to each other into the second doublet L22. The lenses L9 and L10 are bonded to each other into the third doublet L23. The aperture O is disposed between the lens L7 and the lens L8.

The optical element 34 is designed by using the second optical axis M of the reflection surface 42 as the axis in the design stage. In other words, the second optical axis M is the design-stage optical axis of the first transmissive surface 41, the second transmissive surface 43, and the reflection surface 42. The second optical axis M of the reflecting surface 42 extends along the Z axis, as shown in FIG. 12. The first transmissive surface 41 and the reflection surface 42 are located on the lower side Y2 of the second optical axis M, and the second transmissive surface 43 is located on the upper side Y1 of the second optical axis M. In the present example, the first transmission surface 41 and the second transmission surface 43 of the optical element 34 have curved surface shapes different from each other. The first transmissive surface 41, the reflection surface 42, and the second transmissive surface 43 of the optical element 34 are each an aspheric surface. The reflection surface 42 is a reflection coating layer provided on a surface of the optical element 34 that is the surface opposite the first transmissive surface 41. The aspheric surfaces are each a free-form surface in some cases. Also in this case, the free-form surfaces are designed by using the second optical axis M as the design-stage axis.

The pupil P of the second optical system 32 is located inside the optical element 34, as shown in FIG. 12. The pupil P of the second optical system 32 in the plane YZ is defined by the line that connects the upper intersection 53, where the upper peripheral light ray 51a of the upper end light flux 51 passing through the axis-Y-direction upper end of the effective light ray range 50 of the second transmissive surface 43 and the upper peripheral light ray 52a of the lower end light flux 52 passing through the axis-Y-direction lower end of the effective light ray range 50 intersect each other in the plane YZ, to the lower intersection 54, where the lower peripheral light ray 51b of the upper end light flux 51 and the lower peripheral light ray 52b of the lower end light flux 52 intersect each other in the plane YZ. The pupil P inclines with respect to the imaginary vertical line V perpendicular to the second optical axis M of the reflection surface 42 in the plane YZ.

The deflector 33 overlaps with part of the optical element 34 when viewed in the axis-Z direction, as shown in FIG. 12. Specifically, the deflector 33 is so disposed relative to the optical element 34 that the upper end 36 of the deflector 33 that is the upper end in the Y-axis direction is located below in the axis-Y direction the lower peripheral light ray 52b of the lower end light flux 52 passing through the axis-Y-direction lower end of the effective light ray range 50 of the second transmissive surface 43.

The optical path length from the enlargement-side first surface 71 of the lens L14 (first lens) located in a position closest to the enlargement side in the first optical system 31 to the first transmission surface 41 of the optical element 34 is smaller than the diameter of the first surface 71 of the lens L14, as shown in FIG. 12. The optical path length is the axial inter-surface distance between the first surface 71 of the lens L14 and the first transmissive surface 41. The optical path length from the first surface 71 of the lens L14 to the first transmissive surface 41 is also smaller than the diameter of the optical element 34. In other words, the optical path length between the lens L14 and the first transmissive surface 41 is smaller than the diameter of the second transmissive surface 43.

Lens Data

Data on the lenses of the projection system 3C are listed below. The surfaces of the lenses are numbered sequentially from the reduction side toward the enlargement side. Reference characters are given to the lenses, the deflector, the first transmissive surface, the reflection surface, and the second transmissive surface. Data labeled with a surface number that does not correspond to any of the lenses, the deflector, the first transmissive surface, the reflection surface, and the second transmissive surface is dummy data. Reference character R denotes the radius of curvature. Reference character D denotes the axial inter-surface distance. Reference character C denotes the aperture radius, and twice the aperture radius is the diameter of the lens surface. Reference characters R, D, and C are each expressed in millimeters.

| Reference character | Surface number | Shape | R | D | Glass material | Refraction/reflection | C |
|---|---|---|---|---|---|---|---|
| 18 | 0 | Spherical | Infinity | 5.0771 | | Refraction | 0.0000 |
| 19 | 1 | Spherical | Infinity | 21.5089 | SBSL7_OHARA | Refraction | 7.8755 |
| | 2 | Spherical | Infinity | 3.0000 | | Refraction | 10.2986 |
| | 3 | Spherical | Infinity | 0.0000 | | Refraction | 10.8159 |
| | 4 | Spherical | Infinity | 0.0000 | | Refraction | 10.8159 |
| | 5 | Spherical | Infinity | 0.0000 | | Refraction | 10.8159 |
| L1 | 6 | Spherical | 53.1966 | 4.2014 | 709164.2864 | Refraction | 11.0147 |
| | 7 | Spherical | −41.7022 | 0.1000 | | Refraction | 11.0290 |
| L2 | 8 | Spherical | 27.7082 | 6.4631 | 501766.7605 | Refraction | 10.3531 |
| L3 | 9 | Spherical | −18.9273 | 1.0000 | 803424.2331 | Refraction | 9.9295 |
| | 10 | Spherical | −97.5016 | 8.5675 | | Refraction | 9.6317 |
| L4 | 11 | Spherical | 19.8179 | 4.0089 | 449334.8023 | Refraction | 7.0343 |
| L5 | 12 | Spherical | −20.2548 | 1.0000 | 871163.3389 | Refraction | 6.5623 |
| | 13 | Spherical | 14.8625 | 0.5687 | | Refraction | 6.1148 |
| L6 | 14 | Spherical | 16.6642 | 2.8992 | 783834.2385 | Refraction | 6.1814 |
| | 15 | Spherical | −144.2194 | 0.1695 | | Refraction | 5.9601 |
| L7 | 16 | Spherical | −64.5022 | 2.5907 | 444411.8548 | Refraction | 6.0310 |
| | 17 | Spherical | −14.7211 | 2.4709 | | Refraction | 6.0041 |
| O | 18 | Spherical | Infinity | 4.0695 | | Refraction | 5.4350 |
| L8 | 19 | Spherical | −16.9676 | 1.0000 | 755000.5232 | Refraction | 5.0000 |
| | 20 | Spherical | −36.6829 | 17.4568 | | Refraction | 5.3495 |

-continued

| Reference character | Surface number | Shape | R | D | Glass material | Refraction/reflection | C |
|---|---|---|---|---|---|---|---|
| L9 | 21 | Spherical | 24.5580 | 10.2499 | 651310.2952 | Refraction | 12.7188 |
| L10 | 22 | Spherical | −17.9317 | 1.0000 | 922860.2088 | Refraction | 12.6256 |
|  | 23 | Spherical | 31.5665 | 2.9993 |  | Refraction | 13.4242 |
| L11 | 24 | Spherical | 198.1424 | 7.1234 | 846513.2229 | Refraction | 14.0366 |
|  | 25 | Spherical | −23.4883 | 0.1000 |  | Refraction | 14.6454 |
| L12 | 26 | Spherical | −23.0481 | 1.0000 | 755000.5232 | Refraction | 14.6425 |
|  | 27 | Spherical | −32.6368 | 0.1000 |  | Refraction | 15.5539 |
| L13 | 28 | Aspheric | 24.1159 | 5.2774 | E48R_ZEON | Refraction | 16.7255 |
|  | 29 | Aspheric | 36.6129 | 4.8768 |  | Refraction | 17.2476 |
| L14 | 30 | Aspheric | −177.4508 | 6.5704 | E48R_ZEON | Refraction | 17.4000 |
|  | 31 | Aspheric | 31.7435 | 0.4200 |  | Refraction | 20.0869 |
|  | 32 | Spherical | Infinity | 20.1307 |  | Refraction | 18.9266 |
| 33 | 33 | Spherical | Infinity | 0.0000 |  | Reflection | 26.4907 |
|  | 34 | Spherical | Infinity | −4.0000 |  | Refraction | 16.1228 |
| 41 | 35 | Aspheric | −62.8801 | −20.0000 | Z330R_ZEON | Refraction | 14.8689 |
|  | 36 | Spherical | Infinity | 0.0000 | Z330R_ZEON | Refraction | 11.2107 |
| 42 | 37 | Aspheric | 9.1924 | 0.0000 | Z330R_ZEON | Reflection | 12.3542 |
|  | 38 | Spherical | Infinity | 20.0000 | Z330R_ZEON | Refraction | 30.0167 |
| 43 | 39 | Aspheric | −20.8076 | 65.8130 |  | Refraction | 16.0664 |
|  | 40 | Spherical | Infinity | 56.8385 |  | Refraction | 410.2392 |
|  | 41 | Spherical | Infinity | 90.0883 |  | Refraction | 703.7207 |
| S | 42 | Spherical | Infinity | 0.0000 |  | Refraction | 1168.8852 |

The aspheric coefficients are listed below.

| Surface number | S28 | S29 | S30 | S31 |
|---|---|---|---|---|
| Radius of curvature in axis-Y direction | 24.11588374 | 36.61286119 | −177.4508012 | −31.7435443 |
| Conic constant (k) | 0.009502919 | −10.01999614 | 90 | 0 |
| Fourth-order coefficient (A) | −5.64860E−05 | −2.19351E−05 | −4.35015E−05 | −1.66493E−04 |
| Sixth-order coefficient (B) | −5.81995E−08 | −3.37031E−07 | −4.01906E−07 | 2.90969E−07 |
| Eighth-order coefficient (C) | −1.79555E−10 | 4.50036E−10 | 1.01699E−09 | −2.67197E−10 |
| Tenth-order coefficient (D) |  |  |  |  |
| Twelfth-order coefficient (E) |  |  |  |  |

| Surface number | S35 | S37 | S39 |
|---|---|---|---|
| Radius of curvature in axis-Y direction | −62.88009276 | 9.192364066 | −20.80763396 |
| Conic constant (k) | −32.11570134 | −2.912378628 | 0.622550578 |
| Fourth-order coefficient (A) | −1.09445E−04 | 3.47114E−05 | −1.00583E−07 |
| Sixth-order coefficient (B) | 1.38609E−07 | −5.96658E−07 | 9.20087E−08 |
| Eighth-order coefficient (C) | 9.92629E−10 | 2.83434E−09 | −9.00690E−10 |
| Tenth-order coefficient (D) | −5.70113E−12 | −6.81582E−12 | 3.40749E−12 |
| Twelfth-order coefficient (E) | 6.96267E−15 |  | −5.07497E−15 |

Factors of the projection system 3C are listed below: the maximum object height; the numerical aperture; the distance in the second optical axis from the first optical axis to the reflection surface; the quotient of the operation of dividing the distance in the second optical axis from the first optical axis to the reflection surface by the maximum object height of the projection system 3C; the distance in the axis-Z direction from the reflection surface to the outermost shape of the deflector; the quotient of the operation of dividing the distance in the axis-Z direction from the reflection surface to the outermost shape of the deflector by the maximum object height of the projection system 3C; the overall length of the projection system 3C in the axis-Y direction; the quotient of the operation of dividing the overall length of the projection system 3C in the axis-Y direction by the maximum object height of the projection system 3C; and TR. The maximum object height is the dimension from the first optical axis N of the projection system 3C to the farthest point therefrom in the image formation region of the surface of each of the liquid crystal panels 18. The maximum object height is expressed in millimeters. The numerical aperture is abbreviated to NA. The distance in the second optical axis from the first optical axis to the reflection surface is Wh, which is the distance in millimeters in the second optical axis M from the first optical axis N to the reflection surface 42, as shown in FIG. 11. The distance in the axis-Z direction from the reflection surface to the outermost shape of the deflector is Wa, which is the distance in millimeters in the axis-Z direction from the reflection surface 42 to the deflector 33, as shown in FIG. 11. The overall length of the projection system 3C in the axis-Y direction is T, which is the distance in millimeters in the axis-Y direction from the liquid crystal panels 18 to an end of the optical element 34 that is the end on the upper side Y1, as shown in FIG. 11. TR stands for the throw ratio and is the quotient of the operation of dividing the projection distance by the axis-X-direction dimension of a projection image projected on the screen S.

| | |
|---|---|
| Maximum object height (y) | 7.0 |
| NA | 0.241 |
| Wh | 24.0 |
| Wh/y | 3.43 |

-continued

| | |
|---|---|
| Wa | 41.4 |
| Wa/Y | 5.91 |
| T | 162.1 |
| T/y | 23.15 |
| TR (0.37" 16:9LV) | 0.155 |

When the value of Wh/y is smaller than or equal to 5.5 in the projection system 3C, the size of the projection system 3C in the axis-Z direction can be suppressed, whereby the projection system 3C can be compact. When the value of Wh/y is greater than or equal to 3, the projection system 3C is readily designed. In the projection system 3C according to the present example, Wh/y is 3.43.

Effects and Advantages

In the projection system 3C according to the present example, the first transmissive surface 41 and the second transmissive surface 43 of the optical element 34 have curved surface shapes different from each other. The optical element 34 is therefore manufactured in a complicated manner, but the projection distance can be shortened. The projection system according to present example can provide the same effects and advantages as those provided by the projection system according to Example 1 excluding the effect described above.

Figure 13:
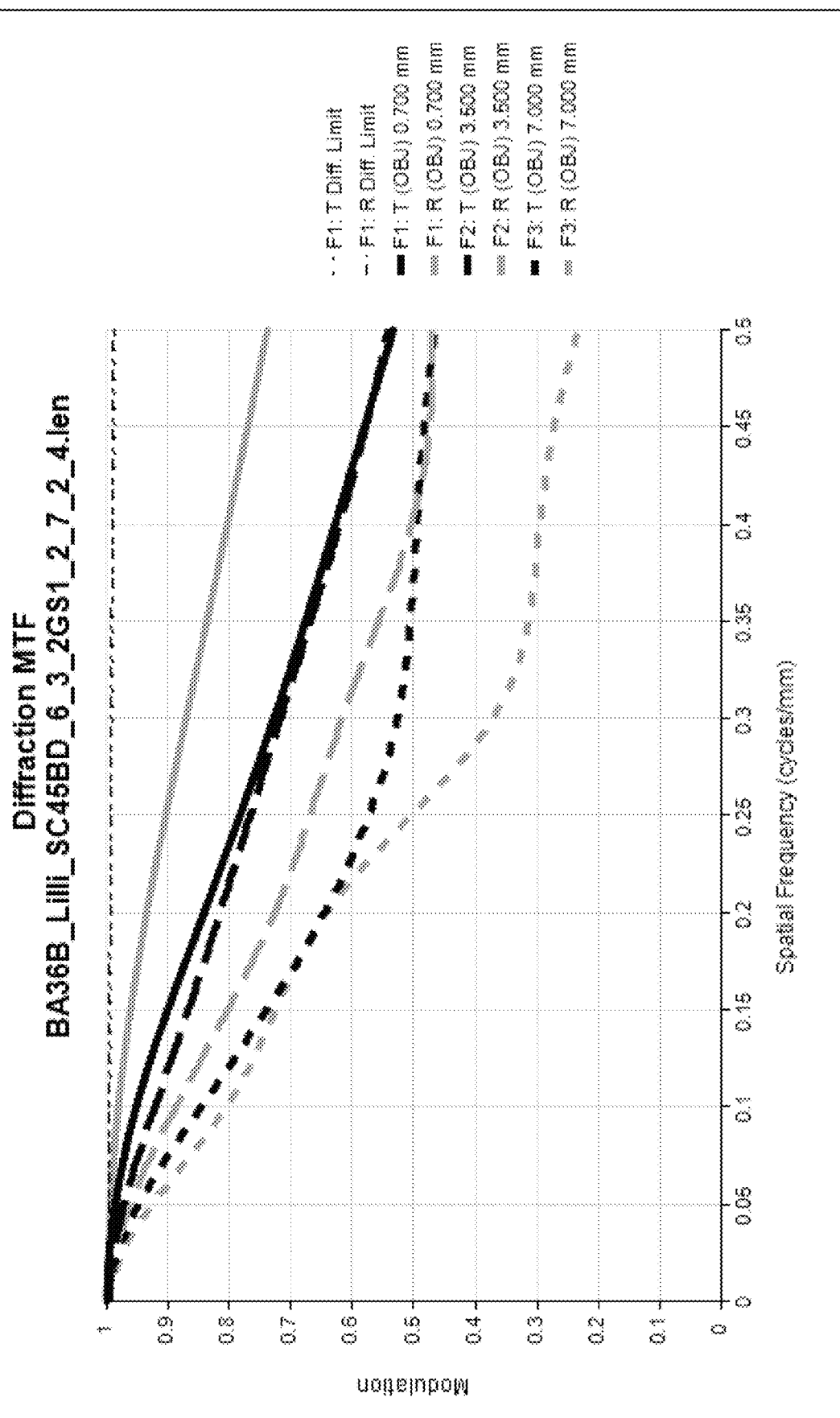
FIG. 13 shows the enlargement-side MTF of the projection system according to Example 3.

FIG. 13 shows the enlargement-side MTF of the projection system 3C. The projection system 3C according to the present example provides high resolution, as shown in FIG. 13.

What is claimed is:

1. A projection system comprising:
a first optical system, the first optical system including a first lens disposed in a position closest to an enlargement side in the first optical system, the first lens having a first surface on the enlargement side;
a second optical system including an optical element and disposed on the enlargement side of the first optical system, the optical element having a first transmissive surface, a reflection surface disposed on an enlargement side of the first transmissive surface, and a second transmissive surface disposed on an enlargement side of the reflection surface, the first transmissive surface and the second transmissive surface having different radii of curvature from each other; and
a mirror disposed between the first optical system and the first transmissive surface and deflecting an optical path between the first optical system and the first transmissive surface,
wherein
a first optical path length from the first surface to the first transmissive surface includes a first portion from the first surface to the mirror and a second portion from the mirror to the first transmissive surface,
a sum of the first portion and the second portion is smaller than a diameter of the optical element,
the mirror reflects light from the first optical system toward the first transmissive surface, forming an angle between the first portion and the second portion, and
the first transmissive surface transmits the light reflected from the mirror to the reflection surface.
2. The projection system according to claim 1, wherein the reflection surface has a concave shape.
3. The projection system according to claim 1, wherein the second transmissive surface has a convex shape protruding toward the enlargement side.
4. The projection system according to claim 1, wherein the first transmissive surface has a convex shape protruding toward a reduction side.
5. The projection system according to claim 1, wherein the optical element is so disposed that a first optical axis of the first optical system intersects a second optical axis of the reflection surface.
6. The projection system according to claim 5, wherein an angle between the second optical axis and the first optical axis is greater than or equal to 90°.
7. The projection system according to claim 5, wherein an angle between the second optical axis and the first optical axis is substantially 90°, and
Wh is a distance along the second optical axis from the first optical axis to the reflection surface, y is a maximum object height in a reduction-side image formation plane, and a conditional expression below is satisfied:

$Wh/y \leq 5.5$.

8. The projection system according to claim 5, wherein a pupil that connects an upper intersection to a lower intersection inclines with respect to an imaginary vertical line perpendicular to the second optical axis in a plane containing the first and second optical axes,
the upper intersection is an intersection where an upper peripheral light ray of an upper end light flux passing through an upper end of an effective light ray range of the second transmissive surface that is an upper end in a first axial direction perpendicular to the second optical axis and an upper peripheral light ray of a lower end light flux passing through a lower end of the effective light ray range that is a lower end in the first axial direction intersect each other in the plane, and
the lower intersection is an intersection where a lower peripheral light ray of the upper end light flux and a lower peripheral light ray of the lower end light flux intersect each other in the plane.
9. The projection system according to claim 5, wherein the first transmissive surface and the reflection surface are located on one side of the second optical axis, and
the second transmissive surface is located on other side of the second optical axis.
10. The projection system according to claim 1, wherein the first optical path length is smaller than a diameter of the first surface of the first lens.
11. The projection system according to claim 1, wherein the first transmissive surface, the reflection surface, and the second transmissive surface each have a shape rotationally symmetric around the second optical axis.
12. The projection system according to claim 1, wherein the reflection surface is an aspheric surface.
13. The projection system according to claim 1, wherein the second transmissive surface is an aspheric surface.
14. The projection system according to claim 1, wherein the first transmissive surface is an aspheric surface.
15. The projection system according to claim 1, wherein an intermediate image is formed on a reduction side of the reflection surface.
16. The projection system according to claim 1, wherein the first optical system is a refractive optical system.

17. A projector comprising:
the projection system according to claim 1; and
a light source and a group of lens that form a projection image in a reduction-side image formation plane of the projection system.

\* \* \* \* \*